United States Patent
Couleaud et al.

(10) Patent No.: US 12,301,936 B2
(45) Date of Patent: May 13, 2025

(54) METHODS AND SYSTEMS FOR CENSORSHIP CUES REMOVAL AND MEDIA RECONSTRUCTION

(71) Applicant: Adeia Guides Inc., San Jose, CA (US)

(72) Inventors: Jean-Yves Couleaud, Mission Viejo, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 12 days.

(21) Appl. No.: 18/216,113

(22) Filed: Jun. 29, 2023

(65) Prior Publication Data

US 2025/0008186 A1    Jan. 2, 2025

(51) Int. Cl.
| | |
|---|---|
| *H04N 21/454* | (2011.01) |
| *G06V 40/16* | (2022.01) |
| *H04N 21/233* | (2011.01) |
| *H04N 21/431* | (2011.01) |
| *H04N 21/466* | (2011.01) |

(52) U.S. Cl.
CPC ....... *H04N 21/4542* (2013.01); *G06V 40/171* (2022.01); *H04N 21/233* (2013.01); *H04N 21/4318* (2013.01); *H04N 21/4665* (2013.01)

(58) Field of Classification Search
CPC ............. H04N 21/4542; H04N 21/233; H04N 21/4318; H04N 21/4665; G06V 40/171
See application file for complete search history.

(56) References Cited

U.S. PATENT DOCUMENTS

| | | | | |
|---|---|---|---|---|
| 6,067,126 | A * | 5/2000 | Alexander | ............... H04N 5/60 |
| 9,767,827 | B2 | 9/2017 | Paquier et al. | |
| 11,533,539 | B2 | 12/2022 | Gattis et al. | |
| 2012/0216222 | A1 * | 8/2012 | Candelore | ................ H04N 7/16 |

FOREIGN PATENT DOCUMENTS

WO    WO2012/076724 A1 *   6/2012   ............. G10L 15/08

OTHER PUBLICATIONS

Comprehensive List of TV Censor Words: https://spoiler-alert.livejournal.com/674545.html.
FCC Obscene, Indecent and Profane Broadcasts: https://www.fcc.gov/enforcement/areas/broadcast-obscenity-indecency-profanity.
https://community.hulu.com/s/idea/0871L000000V7v9QAC/detail.
https://www.engadget.com/microsofts-vall-e-ai-can-simulate-any-persons-voice-from-a-short-audio-sample-112520213.html.

\* cited by examiner

*Primary Examiner* — Anthony Bantamoi
(74) *Attorney, Agent, or Firm* — Haley Guiliano LLP

(57) ABSTRACT

Methods and systems are disclosed herein for reconstructing censored media to an uncensored form using techniques such as content recognition, contextual analysis, facial analysis, voice fingerprinting, and voice reproduction, at the server level within a provider/server/client ecosystem, or at the client level. Specifically, a server or client receives a media stream, then buffers the media stream in a transitory and/or non-transitory memory and identifies a censored audio portion of the buffered media stream. The server then analyzes the video portion of the media stream and constructs a modified version of the censored audio portion based on the analysis of the video portion. The server then transmits, or the client then receives, the modified version of the media stream, which has the uncensored audio version of the censored audio portion of the media stream.

20 Claims, 18 Drawing Sheets

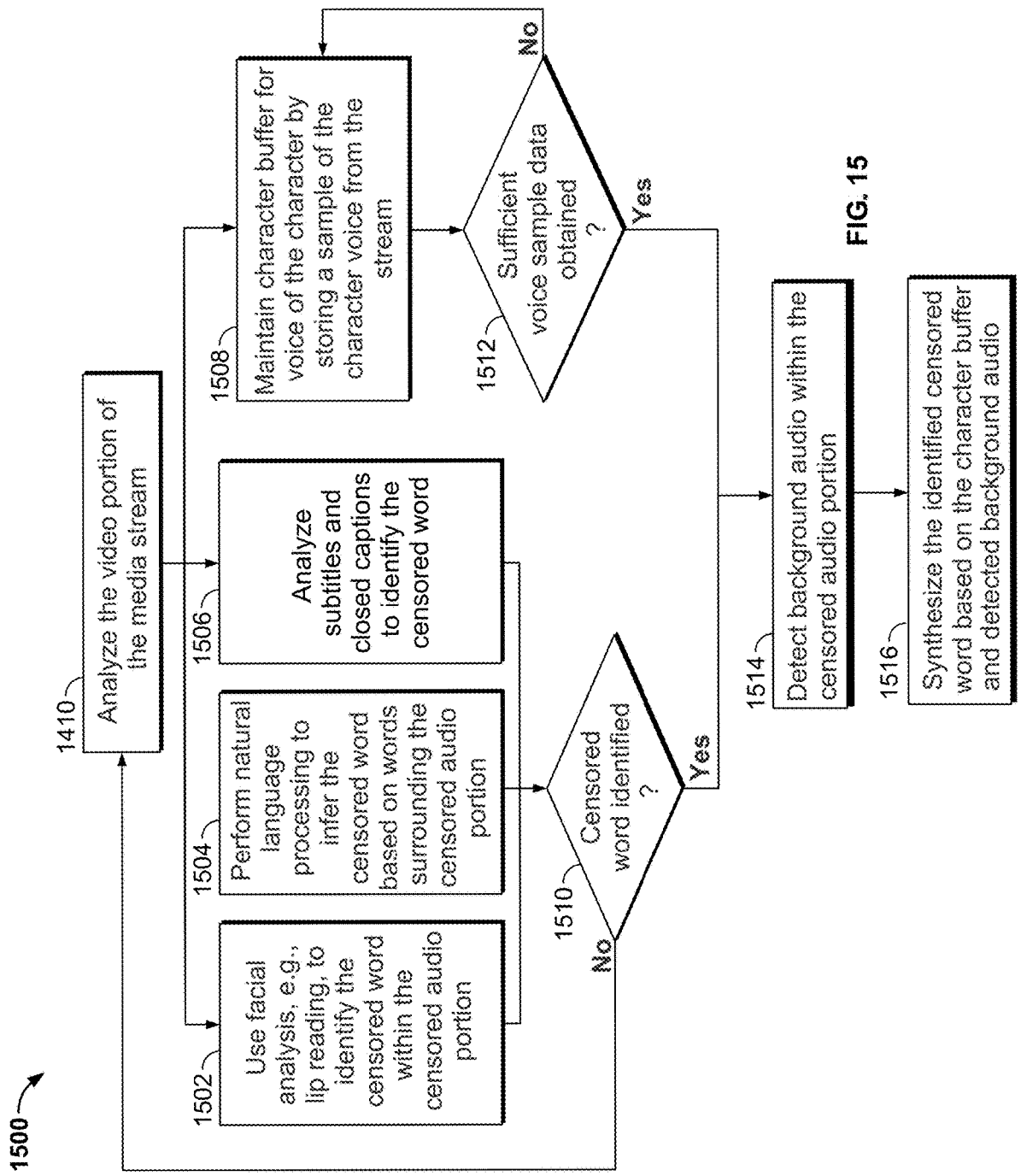

METHODS AND SYSTEMS FOR CENSORSHIP CUES REMOVAL AND MEDIA RECONSTRUCTION

BACKGROUND

The present disclosure is directed towards techniques for processing censored media.

SUMMARY

In some jurisdictions, there are significant limits on what signals may be transmitted over certain types of transmission media, e.g., over-the-air broadcasts, cable, cellular networks, etc. These limits may be standards-based, legal, or customary for certain transmission mediums (e.g., for broadcast networks). The limits restrict, and sometimes prohibit, networks from transmitting content containing signals designated as obscenity or other prohibited signals or materials.

In some embodiments, in order to broadcast a program, obscenity or other prohibited material is actively masked, e.g., by replacing a limited set of obscene words by strident beeps before sending the media over the air (or via another regulated transmission medium). In some approaches, subscription-based networks that are supposedly excluded from the strictest level of the rules still err on the side of caution and maintain the beeping of regulated programs. In other cases, the content is not available in any other form than a beeped-out version and is hence re-transmitted to networks and platform as is. Beeps and discontinuities within media streams make for a suboptimal viewership experience because they disrupt the natural flow of a media stream, and may be confusing or annoying from a user experience standpoint.

The content delivery system may intend to deliver content in its original, uncensored form, but it may be prevented from doing so over its preferred transmission medium, e.g., over-the-air broadcast, due to limitations on which data may be transmitted.

In one approach, uncensored media could be available only via physically distributed hard copies, e.g., DVDs, VHS tapes, Blu-Ray DVDs, and/or USB sticks. This approach is deficient because delivery of hard copies represents significant delay/latency when compared to delivery via broadcast or stream, (e.g., it can take weeks for the content to be manufactured and mailed). This also creates expensive manufacturing of required hardware products. Accordingly, there still exists a need to efficiently make uncensored media available at a local device in an environment where standards-based, legal, or customary limitations prevent transmission over certain data transmission mediums.

To help address these problems, the present disclosure provides systems and methods for reconstructing censored media to an uncensored form using techniques such as content recognition, contextual analysis, facial analysis, voice fingerprinting, and voice reproduction, at the server level within a provider/server/client ecosystem, or at the client level. In some embodiments, at the server level, the intermediary server receives censored material over a restricted medium (e.g., air), then modifies and retransmits the modified material over an unrestricted medium, e.g., over cable, or the internet. In some embodiments, at the client level, the client device receives censored material over a restricted medium, then modifies the material for playback at the client device. In some embodiments, at the client level, the client device receives media in a censored form. For example, a client from an over-the-top (OTT) platform may receive censored content that originated in a broadcast over unrestricted internet transmission. In contrast to hard copies of uncensored media, this approach delivers media streams through digital or analog transmission, cutting out the delays and the expenses of physical media. This approach makes uncensored media widely available in a still affordable manner, without infringing on the limitations digital media transmission mediums may have.

In one approach, a server receives a media stream, then buffers the media stream in a transitory and/or non-transitory memory and identifies a censored audio portion of the buffered media stream. The server then analyzes the video portion of the media stream and constructs a modified version of the censored audio portion based on the analysis of the video portion. The server then transmits the modified version of the media stream, which has the uncensored audio version of the censored audio portion of the media stream.

In another approach, a client device receives a media stream, then buffers the media stream in a memory, and identifies a censored audio portion of the buffered media stream. The client device then analyzes the video portion of the media stream and constructs a modified version of the censored audio portion based on the analysis of the video portion. The client device then plays the modified version of the media stream, which has the uncensored audio version of the censored audio portion of the media stream.

These approaches provide a system with user interface options to output media in its original, uncensored form, while providers stay compliant with transmission regulations.

In one approach, the server transmits an unmodified version of the media stream along with the modified version. The transmission of the modified version, the unmodified version, or both versions may be encrypted.

In some embodiments, the media stream has a video portion as well as an audio portion.

In one approach, the server or client identifies the censored audio portion of the buffered media stream by detecting a beep sound, a silence, or a partially muted portion within the audio portion of the media stream. In some embodiments, detecting a beep sound can be performed using methods known in the art such as fast Fourier transform (FFT).

In one approach, the server or client generates a user interface option for choosing to output the uncensored version of the media stream. In this approach, when the server or client detects a selection of the user interface option for choosing to output the uncensored audio version of the media stream, the server or client then identifies the censored audio portion of the buffered media stream and will further cause the system to perform one or more processes, such as processes corresponding with steps 1408 through 1416 of FIG. 14.

In another approach, the server or client generates a user interface option to set an overall profanity level for the media stream. In this approach, when the server or client detects a selection of the user interface option to hear the media stream at a high profanity level, the server or client then identifies the censored audio portion of the buffered media stream.

In another approach, the server or client generates a user interface option to set a profanity level for the type of media content within a media stream. In this approach, when the server or client detects a selection of the user interface option to hear the uncensored version of the type of media content within the media stream, the server or client then identifies the censored audio portion of the buffered media stream.

Such aspects enable a server or client to build a personalized censorship experience for user. A user should be able to choose exactly the censorship that they want in the media they consume, and specific user interface options setting the level and type of censorship ensures that the user feels in charge of their experience. Further, the server or client saves resources by uncensoring only what the user specifies they want, instead of uncensoring the entire media stream.

In some embodiments, the server or client analyzes the video portion of the media stream to identify a censored word within the censored audio portion of the media stream. In some embodiments, the server or client analyzes the video portion of the media stream to detect a character depicted in the media stream. In some embodiments, the server or client analyzes the video portion of the media asset before identifying the censored audio portion of the buffered media stream. In some embodiments, the server or client analyzes the video portion of the media asset while identifying the censored audio portion of the buffered media stream. In some embodiments, the server or client analyzes the video portion of the media asset after identifying the censored audio portion of the buffered media stream.

The server or client identifies a censored word within the censored audio portion of the media stream by, for example, performing facial analysis of the video portion of the media stream to identify the censored word. One aspect of the performed facial analysis may be lip-reading analysis.

In another example, the server or client identifies the censored word within the censored audio portion of the media stream by performing natural language processing to infer the censored word based on words surrounding the censored audio portion of the media stream.

In another example, the server or client identifies the censored word within the censored audio portion of the media stream by analyzing subtitles and closed captions to identify the censored word.

In another example, the server or client identifies the censored word within the censored audio portion of the media stream using any one or a combination of natural language processing to infer the censored word based on words surrounding the censored audio portion of the media stream, facial analysis of the video portion of the media stream, subtitle analysis simultaneously or in succession, or any other suitable contextual analysis.

In some embodiments, the server or client identifies the censored word within the censored audio portion of the media stream by training a classifier machine learning model based on a training set comprising video recordings of characters pronouncing words that are likely to be censored and inputting into the classifier machine learning model the video portion and the audio portion of the media stream. In this example, the identified censored word is the output of the classifier machine learning model.

Such aspects enable a server or client to determine, through lip reading technology, natural language processing, or a machine learning model, a very close approximation of the word, or the exact word, that the character is saying. In this way, the server or client obtains a crucial part of reconstructing the censored portion: the censored word itself.

In some embodiments, the server or client maintains a ranked list of profane words and determines whether to construct the modified version of the censored audio portion of the media stream based on the placement of the identified censored word on the ranked list of profane words.

In some embodiments, the server or client constructs the modified version of the censored audio portion of the media stream using a replacement word by comparing the identified censored word within the censored audio portion to a list of words with similar meanings and significance of the identified censored word, determining a replacement word for the identified censored word. In one approach, the server or client uses a replacement word to construct the modified version of the censored audio portion of the media stream after detecting a selection of the user interface option to hear the type of media content within the media stream at a low profanity level.

Such aspects enable the server or client to create a realistic reconstruction of the censored portion even at a lower profanity level. Although a user may not wish to hear profanity in their media content, they may still want a seamless viewing experience without beeps or silences as interruptions.

In response to detecting a character depicted in the media stream, the server or client may, for example, maintain a character buffer for a voice of the character by storing a sample of the character's voice from the media stream. In some embodiments, the server or client generates user interface options for selecting to hear a censored or uncensored voice of the character and other characters. In some embodiments, the server or client maintains the character buffer for the voice of a character after detecting a selection of the user interface option to hear the uncensored voice of that character. In some embodiments, when the server or client detects a selection to hear the censored voice of a character, the server or client does not construct an uncensored audio version of the censored audio portion of the media stream for that character.

Such aspects enable the server or client to gather data for what the censored character's voice sounds like throughout the media stream for a variety of different words, in order to accurately recreate the censored portion in the voice and tone of the character, fully capturing the context of the scene. Further, in this way, the server or client is collecting voice data efficiently; only for the characters that need to be uncensored, and only storing data in the amounts necessary and only for the length of time necessary to reconstruct the censored character's voice accurately.

In some embodiments, the server or client constructs the modified version of the censored audio portion of the media stream by synthesizing the identified censored word based on the character buffer. In some embodiments, the server or client detects background audio within the censored audio portion, as well as before and after the censored portion, and integrates the background audio into the modified version of the censored audio portion of the media stream.

The server or client may synthesize the identified censored word based on the character buffer by, for example, training a synthesizer machine learning model based on a training set comprising pairs of censored and uncensored voice samples and inputting into the synthesizer machine learning model the identified censored word and the buffered voice of the character to cause the machine learning model to output the uncensored audio version of the censored audio portion of the media stream. In another example, the server or client may modify one or more previously stored samples of the voice of the character, in some cases from different media streams, and input the one or more modified previously stored voice samples instead of the buffered voice of the character, into the synthesizer machine learning model, along with recordings of some amount of audio surrounding the censored portion, e.g., five seconds of surrounding audio. In some embodiments, the outputted synthesized identified censored word is a more accurate representation of the context, pitch, tone, and delivery speed of the original censored portion of the media stream, and the replacement word will blend well to improve user experience.

Such aspects enable the server or client to reconstruct a censored portion that reflects the original identified censored word correctly, that reflects the original censored character's voice to a high degree of accuracy, and that integrates the background noise of the original censored portion. This allows for a seamless viewing experience for the user, where the user may not even be able to tell that the reconstructed portion was originally censored, making for a much more pleasant viewing experience.

BRIEF DESCRIPTION OF THE DRAWINGS

The present disclosure, in accordance with one or more various embodiments, is described with reference to the following figures. The drawings are provided for purposes of illustration only and merely depict typical or example embodiments. These drawings are provided to facilitate an understanding of the concepts disclosed herein and do not limit the breadth, scope, or applicability of these concepts. It should be noted that for clarity and ease of illustration these drawings are not necessarily made to scale.

FIG. 15 shows a flowchart of an illustrative process for processing censored media, in accordance with some embodiments of the present disclosure.

DETAILED DESCRIPTION OF EMBODIMENTS OF THE DISCLOSURE

Figure 1A:
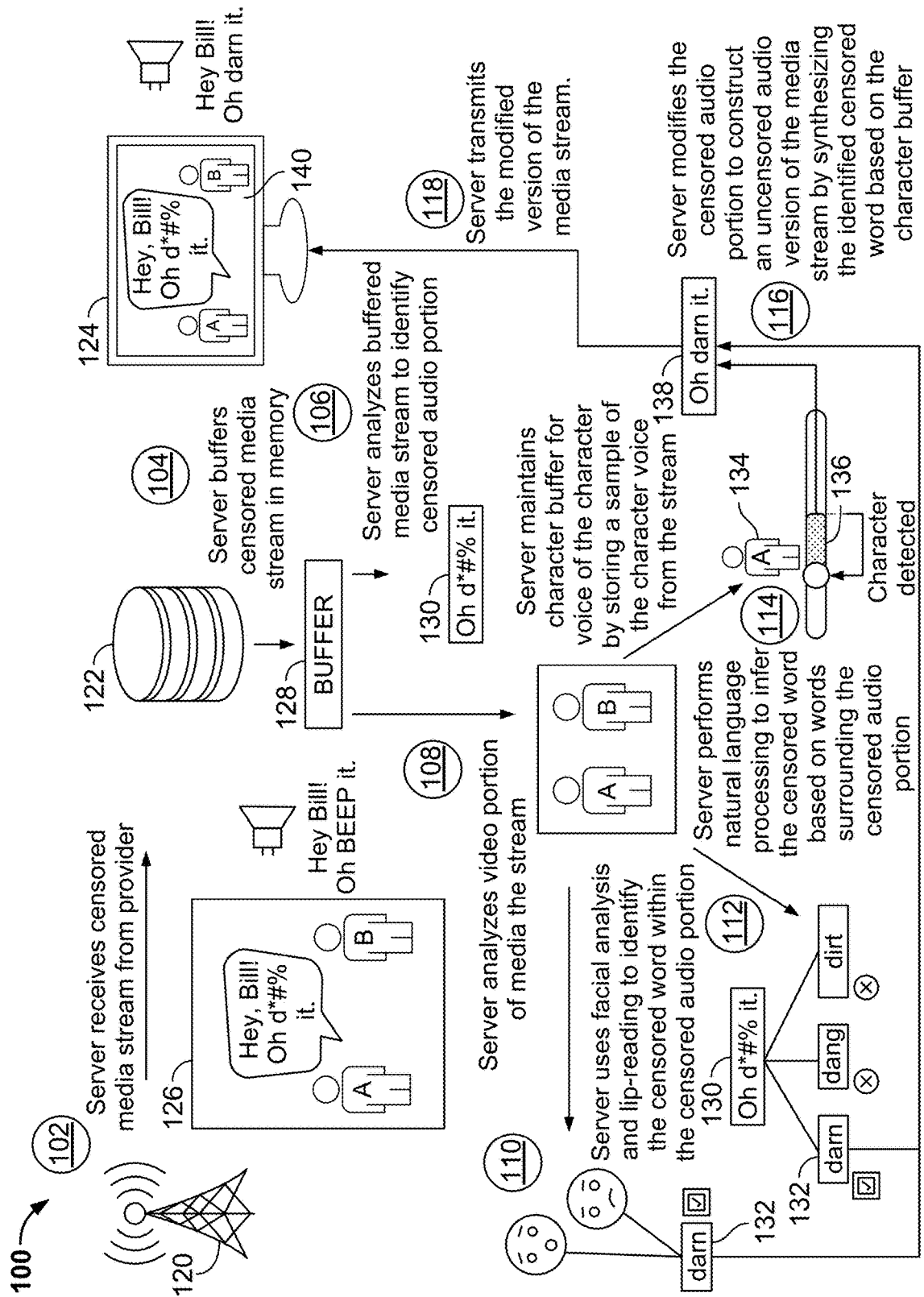
FIG. 1A is an illustrative example of a system for processing censored media at a server, in accordance with some embodiments of the present disclosure.

FIG. 1A shows an illustrative example of a system 100 for processing censored media at a server, in accordance with some embodiments of the present disclosure. In some embodiments, system 100 includes provider 120, server 122, and client device 124. System 100 may include additional servers, devices and/or networks. For example, functionality of server 122 may be shared between several servers, providing a cloud computing solution.

In some examples, the steps outlined within system 100 are performed by server 122. For example, a non-transitory memory of server 122 may store instructions that, when executed by processors of those devices, cause execution of the steps outlined within system 100.

In some embodiments, at step 102, server 122 receives censored media stream 126 from provider 120. For example, in the U.S., all broadcast media is actively censored. Censorship of broadcast media is regulated and enforced by the Federal Communications Commission (FCC). Under 18 U.S.C. Section 1464, "whoever utters any obscene, indecent, or profane language by means of radio communication shall be fined under this title or imprisoned not more than two years, or both." Under 18 U.S.C. Section 1468 (a), "whoever knowingly utters any obscene language or distributes any obscene matter by means of cable television or subscription services on television, shall be punished by imprisonment for not more than two years or by a fine in accordance with this title, or both." Likewise, under 47 U.S.C. Section 559, "whoever transmits over any cable system any matter which is obscene or otherwise unprotected by the Constitution of the United States shall be fined under Title 18 or imprisoned not more than two years, or both." Section 73.3999 of the Commission's rules, applicable to broadcast stations, bans the broadcast of obscene material and prohibits radio and television broadcasts of indecent material between the hours of 6:00 a.m. and 10:00 p.m. In some embodiments, the same regulations apply to subtitles and captions; profanity is not transmitted through audio or text. In some embodiments, profanity within subtitles and captions may be replaced by *** or an equivalent, and in these cases, server 122 would not be able to glean the censored word from the subtitles or captions.

In one implementation, server 122 is an OTT video delivery service server that receives requests over a network (e.g., the internet, a cellular network, or any suitable network) from client devices (e.g., smartphones, computers, laptops, etc.,) to view media streams (e.g., media stream 126). Such OTT server may then provide media assets for streaming, local storage, downloading, or for other media consumption operation to the requesting device.

In some embodiments, server 122 then proceeds to process step 104. At process step 104, server 122 buffers censored media stream 126 in a memory of server 122, e.g., a non-transitory memory, to produce buffered media stream 128. In some embodiments, server 122 then proceeds to process step 106. In some embodiments, server 122 proceeds to process step 106 only in response to server 122 receiving a selection of one or more user interface options, e.g., as described below with reference to FIG. 12. At process step 106, server 122 analyzes the buffered media stream 128 to identify a censored audio portion 130. The censored audio portion 130 may be identified in any suitable manner, e.g., as described below with reference to FIG. 7. In some embodiments, server 122 detects that a character 134 is mouthing a word that would have been censored but character 134 does not actually say any word, and no audio censorship occurs. In this case, server 122 does not continue process 100 to identify the censored word and replace it.

In some embodiments, server 122 then proceeds to process step 108. In some embodiments, at process step 108, server 122 analyzes the video portion of media stream 126 to identify the censored word 132 within the censored audio portion 130 and maintain a character buffer 136 for the character 134 who spoke the censored audio portion 130. In some embodiments, server 122 completes process step 108 prior to completing process step 106, at which server 122 analyzes the buffered media stream 128 to identify the censored audio portion 130. In some embodiments, server 122 completes process step 108 while completing process step 106, at which server 122 analyzes the buffered media stream 128 to identify the censored audio portion 130. In some embodiments, server 122 completes process step 108 after completing process step 106, at which server 122 analyzes the buffered media stream 128 to identify the censored audio portion 130.

In one approach, subtitles and closed captions are included as part of the video portion of media stream 126, and as part of process step 108, server 122 may identify the censored word 132 based on analyzing subtitles and closed captions 132. As part of process step 108, server 122 may identify the censored word 132 using any other form of contextual analysis, e.g., character gesture interpretation, verbal and non-verbal reactions of other characters in the media stream, tonal interpretation, pitch interpretation, facial analysis, or any other suitable technique may be used. As a part of process step 108, server 122 may identify the censored word 132 within the censored audio portion 130 in any suitable manner, e.g., as described below with reference to FIG. 2. As a part of process step 108, to identify the censored word 132 within the censored audio portion 130, server 122 may complete any one or both of process step 110 and process step 112, alone or in combination.

In some embodiments, at process step 110, server 122 uses facial analysis and lip-reading to identify the censored word 132 within the censored audio portion 130, e.g., as described below with reference to FIG. 4. In some embodiments, at process step 112, server 122 performs natural language processing to infer the censored word 132 based on words surrounding the censored audio portion 130, e.g., as described below with reference to FIG. 8. Server 122 may also complete process step 114 as part of process step 108. In some embodiments, process step 114 is completed only in response to server 122 receiving a selection of one or more user interface options, e.g., as described further below with reference to FIG. 12. In some embodiments, at process step 114, server 122 maintains a character buffer 136 for the voice of the character 134 who says the censored audio portion. In some embodiments, server 122 maintains the character buffer 136 by storing a sample of the character's voice from the audio portion of media stream 126. In some embodiments, server 122 begins maintaining the character buffer 136 when character 134's voice is first detected within media stream 126.

In some embodiments, server 122 then proceeds to process step 116. In some embodiments, server 122 completes process step 116 in response to the identified censored word 132 having a sufficiently high placement on a ranked list of profane words maintained by server 122. In some embodiments, at process step 116, server 122 modifies the censored audio portion 130 to construct an uncensored audio version 138 of media stream 126. In one approach, server 122 constructs uncensored audio version 138 by synthesizing the identified censored word 132 from process steps 110 and/or 112, based on the character buffer 136 maintained in process step 114. The server 122 may construct uncensored audio version 138 in any suitable manner, e.g., as described below with reference to FIG. 3.

In another approach, the server 122 may construct an uncensored audio version 138 using a replacement word determined by comparing the identified censored word 132 within the censored audio portion 130 to a list of words with similar meanings and significance of the identified censored word 132: see, e.g., Table 1.

TABLE 1

Replacement Word Determination

| Target Word | Replacement Word | Weight Value |
| --- | --- | --- |
| Frick | Freak | 95% |
| Frick | Fudge | 50% |
| Frick | Fiddlesticks | 35% |
| Damn | Darn | 98% |
| Damn | Dang | 45% |
| Damn | Doggone | 5% |

In some embodiments, as shown in Table 1, three possible replacements for "Damn" are "Darn," "Dang," and "Doggone." In some embodiments, each replacement has a corresponding weight value, which indicates how accurate the replacement word is in meaning, significance, and sound. In some embodiments, "Darn" has a 95% weight value, "Dang" has a 45% weight value, and "Doggone" has a 5% weight value; thus, "Darn" is determined to be the best replacement word for "Damn." In some embodiments, the replacement word determination table is created and stored in a database for future use. In some embodiments, censored words are converted to vectors and compared with potential replacement words using the word2vec algorithm. The word2vec algorithm uses a neural network to learn word associations from text. Word2vec detects synonymous words by representing words with vectors and mapping the level of semantic similarity between the words represented by those vectors. Word2vec is discussed in more detail, for instance, in U.S. Pat. No. 11,410,032, filed Jun. 21, 2019, and naming DeGirum Corporation as Applicant, the contents of which are hereby incorporated by reference herein in their entirety.

In some embodiments, server 122 then proceeds to process step 118. In some embodiments, at process step 118, server 122 transmits the modified version of the media stream 140 to the client device 124. In some embodiments, server 122 may transmit an unmodified version of media stream 126 along with the modified version 140 to the client device 124. In some embodiments, one or both of the transmission of the modified version 140 and the transmission of the unmodified version 126 are encrypted.

The improvement aspects outlined in system 100 may be combined in any suitable combination, taken in part, or as a whole.

Figure 1B:
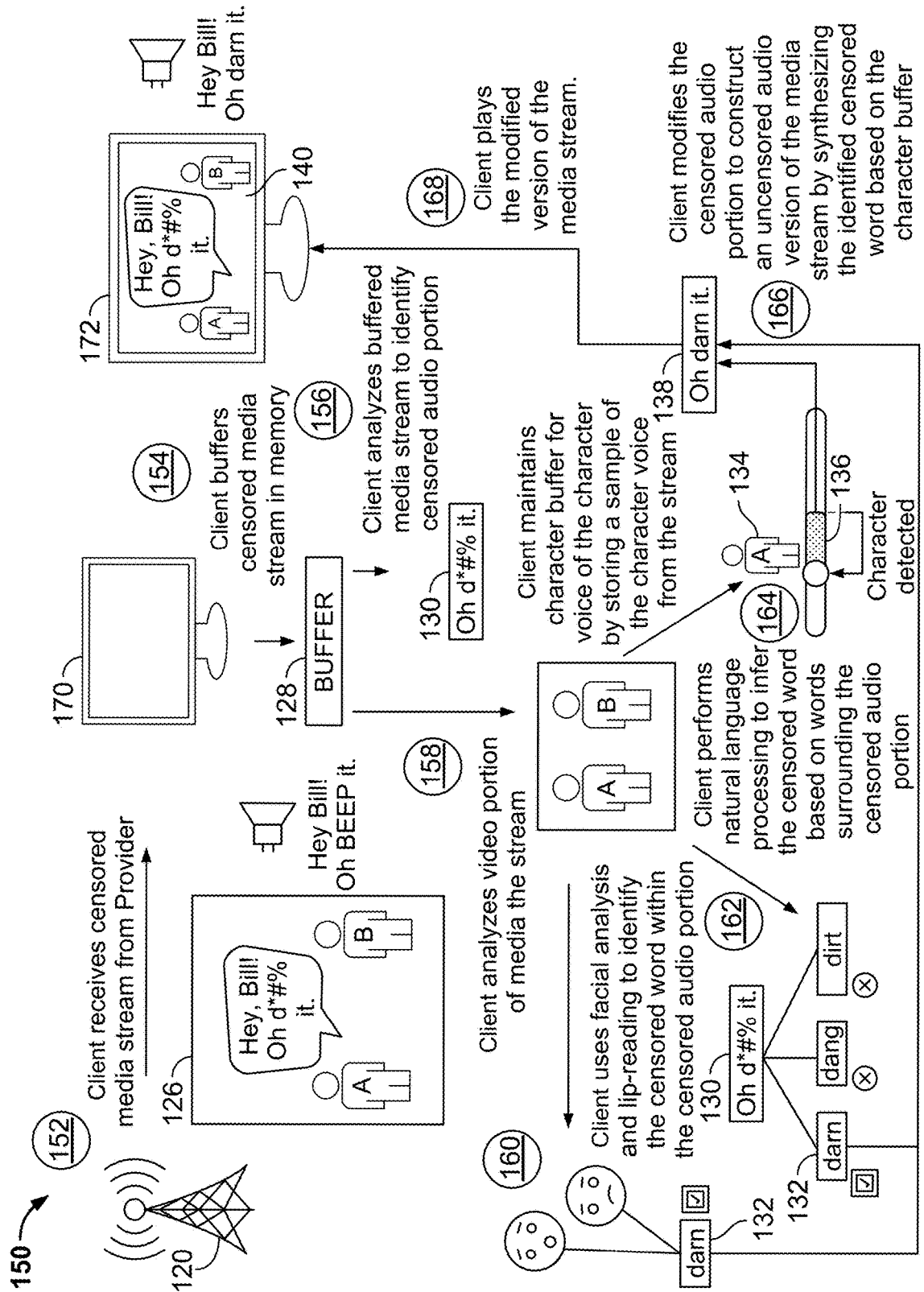
FIG. 1B is an illustrative example of a system for processing censored media at a client device, in accordance with some embodiments of the present disclosure.

FIG. 1B is an illustrative example of a system for processing censored media at a client device, in accordance with some embodiments of the present disclosure. In some embodiments, system 150 includes provider 120 and client device 170. System 150 may include additional servers, devices and/or networks.

In some embodiments, at step 152, client device 170 receives censored media stream 126 from provider 120. In some embodiments, client device 170 then proceeds to process step 154. At process step 154, client device 170 buffers censored media stream 126 in a memory of client device 170, e.g., a non-transitory memory, to produce buffered media stream 128. In some embodiments, client device 170 then proceeds to process step 156. In some embodiments, client device 170 proceeds to process step 156 only in response to client device 170 receiving a selection of one or more user interface options, e.g., as described below with reference to FIG. 12. At process step 156, client device 170 analyzes the buffered media stream 128 to identify a censored audio portion 130. The censored audio portion 130 may be identified in any suitable manner, e.g., as described below with reference to FIG. 7.

In some embodiments, client device 170 then proceeds to process step 158. In some embodiments, at process step 158, client device 170 analyzes the video portion of media stream 126 to identify the censored word 132 within the censored audio portion 130 and maintain a character buffer 136 for the character 134 who spoke the censored audio portion 130. In some embodiments, client device 170 completes process step 158 prior to completing process step 156, at which client device 170 analyzes the buffered media stream 128 to identify the censored audio portion 130. In some embodiments, client device 170 completes process step 158 while completing process step 156, at which client device 170 analyzes the buffered media stream 128 to identify the censored audio portion 130. In some embodiments, client device 170 completes process step 158 after completing process step 156, at which server 122 analyzes the buffered media stream 128 to identify the censored audio portion 130.

In one approach, subtitles and closed captions are included as part of the video portion of media stream 126, and as part of process step 158, client device 170 may identify the censored word 132 based on analyzing subtitles and closed captions. As part of process step 158, client device 170 may identify the censored word 132 using any other form of contextual analysis, e.g., character gesture interpretation. As a part of process step 158, client device 170 may identify the censored word 132 within the censored audio portion 130 in any suitable manner, e.g., as described below with reference to FIG. 2. As a part of process step 158, to identify the censored word 132 within the censored audio portion 130, client device 170 may complete any one or both of process step 160 and process step 162, alone or in combination.

In some embodiments, at process step 160, client device 170 uses facial analysis and lip-reading to identify the censored word 132 within the censored audio portion 130, e.g., as described below with reference to FIG. 4. In some embodiments, at process step 162, client device 170 performs natural language processing to infer the censored word 132 based on words surrounding the censored audio portion 130, e.g., as described below with reference to FIG. 8. Client device 170 may also complete process step 164 as part of process step 158. In some embodiments, process step 164 is completed only in response to client device 170 receiving a selection of one or more user interface options, e.g., as described further below with reference to FIG. 12. In some embodiments, at process step 164, client device 170 maintains a character buffer 136 for the voice of the character 134 who says the censored audio portion. In some embodiments, client device 170 maintains the character buffer 136 by storing a sample of the character's voice from the audio portion of media stream 126. In some embodiments, client device 170 begins maintaining the character buffer 136 when character 134's voice is first detected within media stream 126.

In some embodiments, client device 170 then proceeds to process step 166. In some embodiments, client device 170 completes process step 166 in response to the identified censored word 132 having a sufficiently high placement on a ranked list of profane words maintained by client device 170. In some embodiments, at process step 166, client device 170 modifies the censored audio portion 130 to construct an uncensored audio version 138 of media stream 126. In one approach, client device 170 constructs uncensored audio version 138 by synthesizing the identified censored word 132 from process steps 160 and/or 162, based on the character buffer 136 maintained in process step 164. In one approach, the client device 170 may construct an uncensored audio version 138 using a replacement word determined by comparing the identified censored word 132 within the censored audio portion 130 to a list of words with similar meanings and significance of the identified censored word 132: see, e.g., Table 1 and its description within FIG. 1A above. The client device 170 may construct uncensored audio version 138 in any suitable manner, e.g., as described below with reference to FIG. 3.

In some embodiments, client device 170 then proceeds to process step 168. In some embodiments, at process step 168, client device 170 plays the modified version of the media stream 140.

The improvement aspects outlined in system 150 may be combined in any suitable combination, taken in part, or as a whole.

Figure 2:
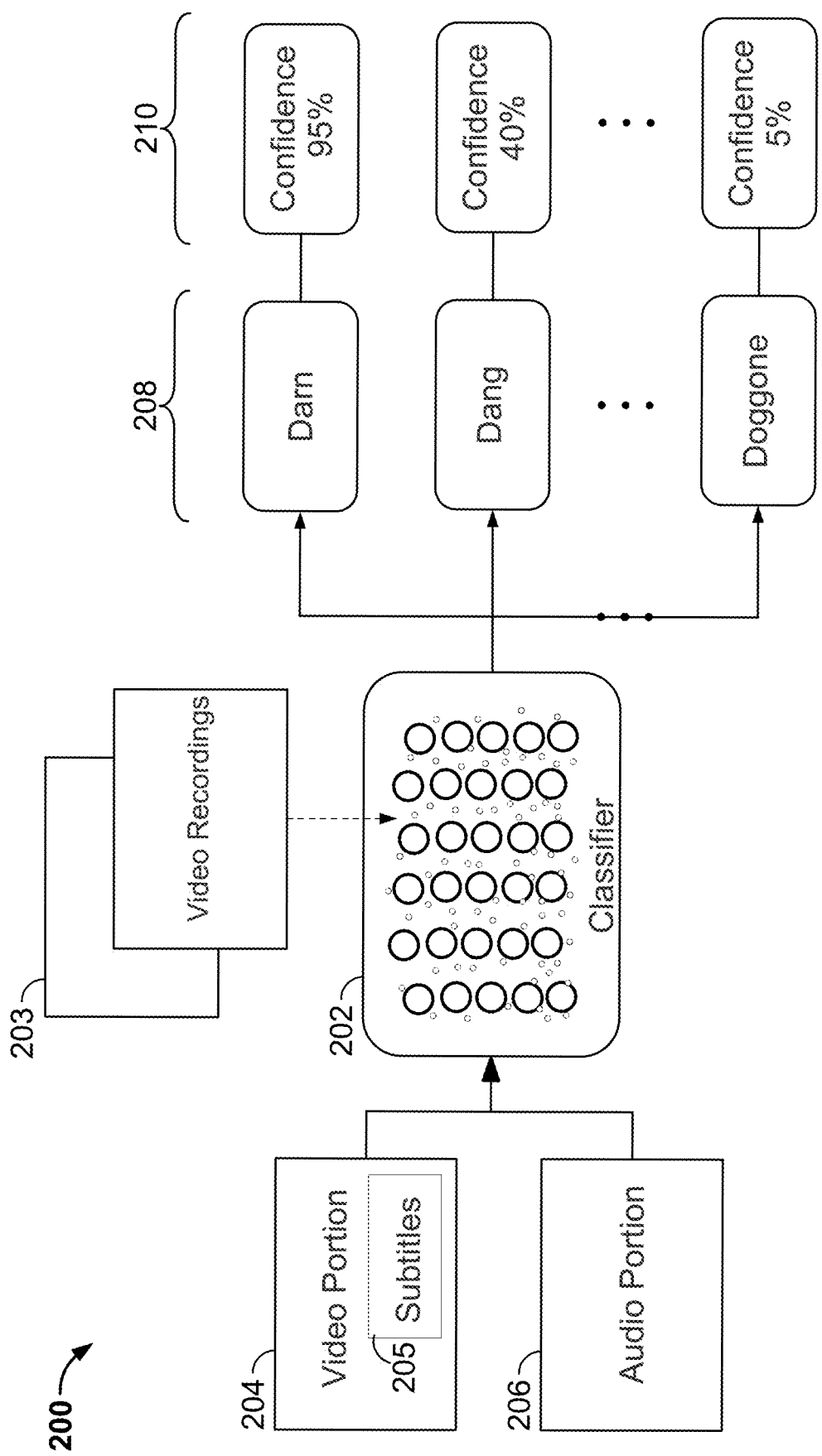
FIG. 2 is an illustrative example of a classifier machine learning model for identifying censored words within censored media streams, in accordance with some embodiments of the present disclosure.

FIG. 2 is an illustrative example of a classifier machine learning model for identifying censored words within censored media streams, in accordance with some embodiments of the present disclosure. In some embodiments, system 200 includes video recordings 203, video portion 204 including subtitles 205, audio portion 206, classifier machine learning model 202, potential identified censored words 208, and respective confidence scores 210.

In some embodiments, classifier machine learning model 202 is trained based on a training set of video recordings 203. In some embodiments, the video recordings 203 are of a character, e.g., character 134 of FIGS. 1A and 1B, pronouncing words that are likely to be censored. In some embodiments, video portion 204 and audio portion 206 are the video and audio portions of media stream 126 of FIGS. 1A and 1B. In some embodiments, the audio portion is the censored audio portion 130 of FIGS. 1A and 1B. In some embodiments, subtitles 205 are part of or otherwise associated with video portion 204. In one approach, video portion 204, subtitles 205, and audio portion 206 are inputs to the classifier machine learning model 202. In some approaches, potential identified censored words 208 with respective confidence scores 210 are the outputs of the classifier machine learning model 202. In some embodiments, the identified censored word 132 of FIGS. 1A and 1B is one of the potential identified censored words, for example, the potential identified censored word of the potential identified censored words 208 with the highest respective confidence score of the respective confidence scores 210.

Figure 3:
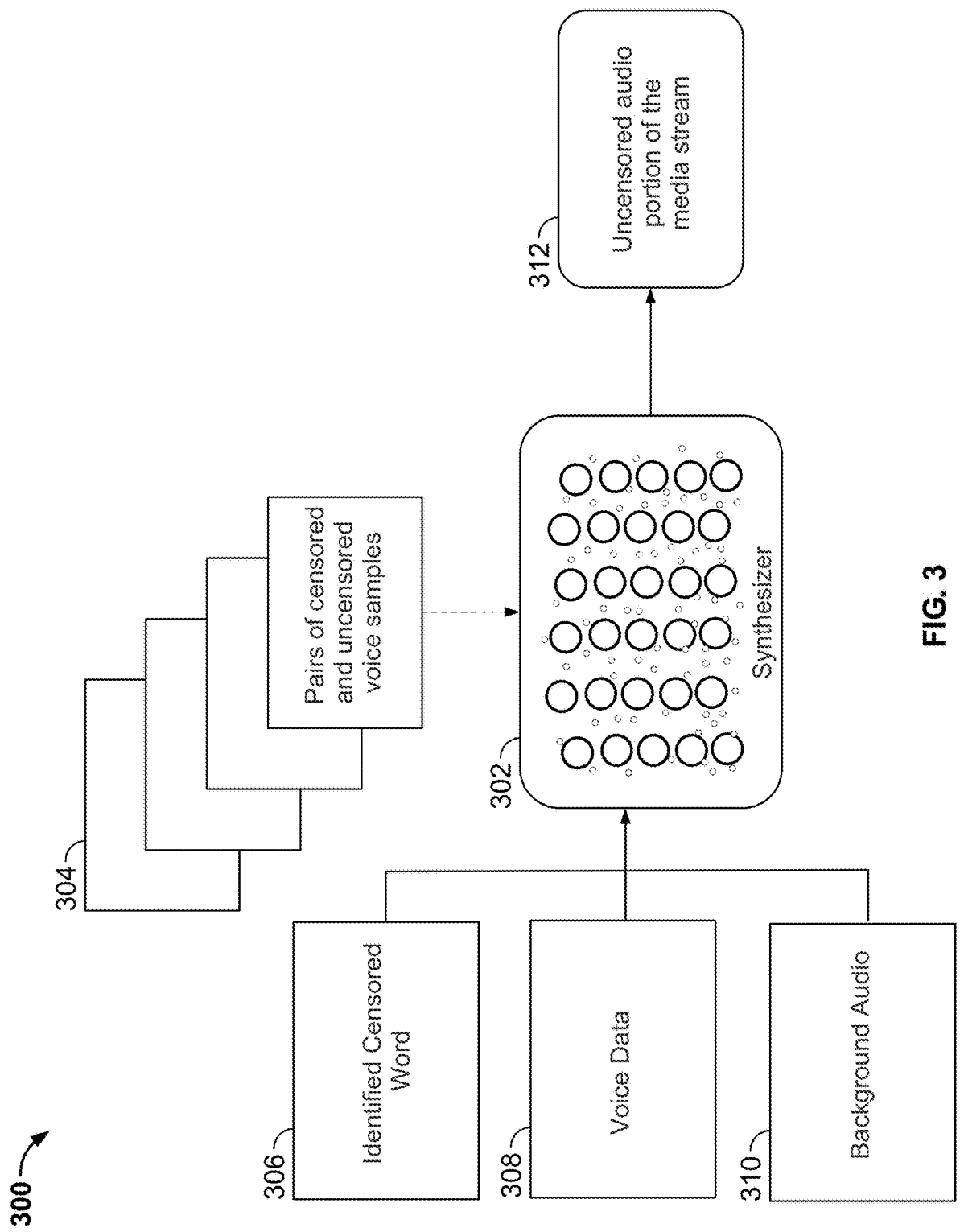
FIG. 3 is an illustrative example of a synthesizer machine learning model for constructing uncensored versions of censored media streams, in accordance with some embodiments of the present disclosure.

FIG. 3 is an illustrative example of a synthesizer machine learning model for constructing uncensored versions of censored media streams, in accordance with some embodiments of the present disclosure. In some embodiments, system 300 includes synthesizer machine learning model 302, pairs of censored and uncensored voice samples 304, identified censored word 306, voice data 308, background audio 310, and uncensored audio portion of the media stream 312.

In some embodiments, synthesizer machine learning model 302 is trained based on a training set of pairs of censored and uncensored voice samples 304. In some embodiments, the pairs of censored and uncensored voice samples 304 are spoken by a character, e.g., character 134 of FIGS. 1A and 1B. In some embodiments, identified censored word 306 is the identified censored word 132 of FIGS. 1A and 1B. In some embodiments, voice data 308 is the character buffer 136 of FIGS. 1A and 1B. In some embodiments, voice data 308 is stored character's voice samples, as described further below with reference to FIG. 11. In some embodiments, background audio 310 is detected background audio within the censored audio portion 130 of media stream 126 of FIGS. 1A and 1B. In one approach, identified censored word 306, voice data 308, and background audio 310 are inputs to the synthesizer machine learning model 302. In some approaches, uncensored audio portion of the media stream 312 is an output of synthesizer machine learning model 302. In some embodiments, uncensored audio portion of the media stream 312 is uncensored audio version 138 of media stream 126 of FIGS. 1A and 1B.

Figure 4:
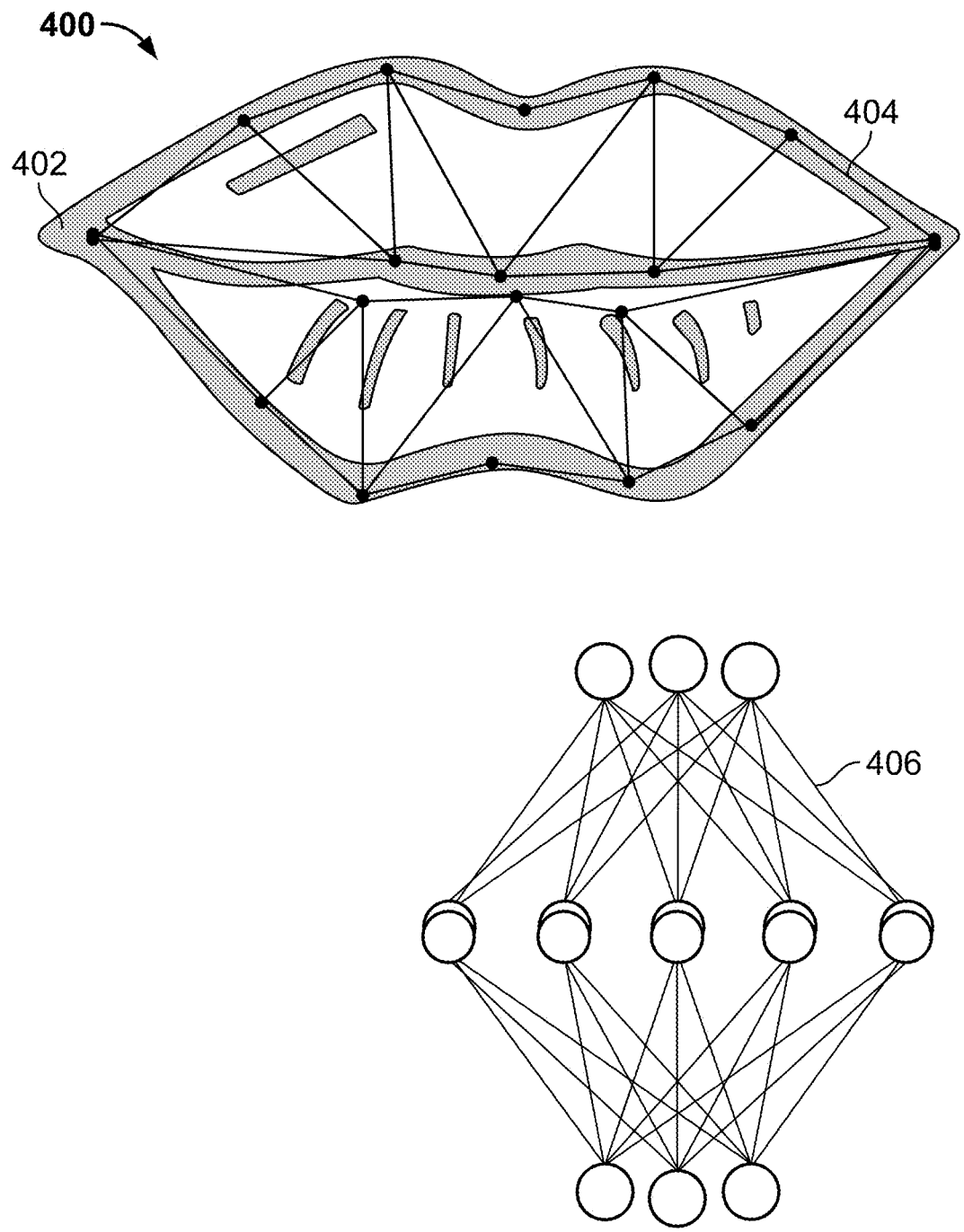
FIG. 4 is an illustrative example of a system for lip-reading analysis, in accordance with some embodiments of the present disclosure.

FIG. 4 is an illustrative example of a system for lip-reading analysis. In some embodiments, system 400 includes a character's lips 402, vectors mapped to the muscles of a character's lips 404, and lip-reading machine learning model 406. In some embodiments, a server, e.g., server 122 of FIG. 1, or a client device, e.g., client device 170 of FIG. 2, inputs the values of vectors 404 into lip-reading machine learning model 406, e.g., a neural network, which outputs the one or more words that the character is saying. For example, lip reading is further described in Lipreading Using Convolutional Neural Network, in the fifteenth annual conference of the international speech communication association, by Noda, K., Yamaguchi, Y., Nakadai, K., Okuno, H. G., & Ogata, T. (2014), the contents of which are hereby incorporated by reference herein in their entirety.

Figure 5:
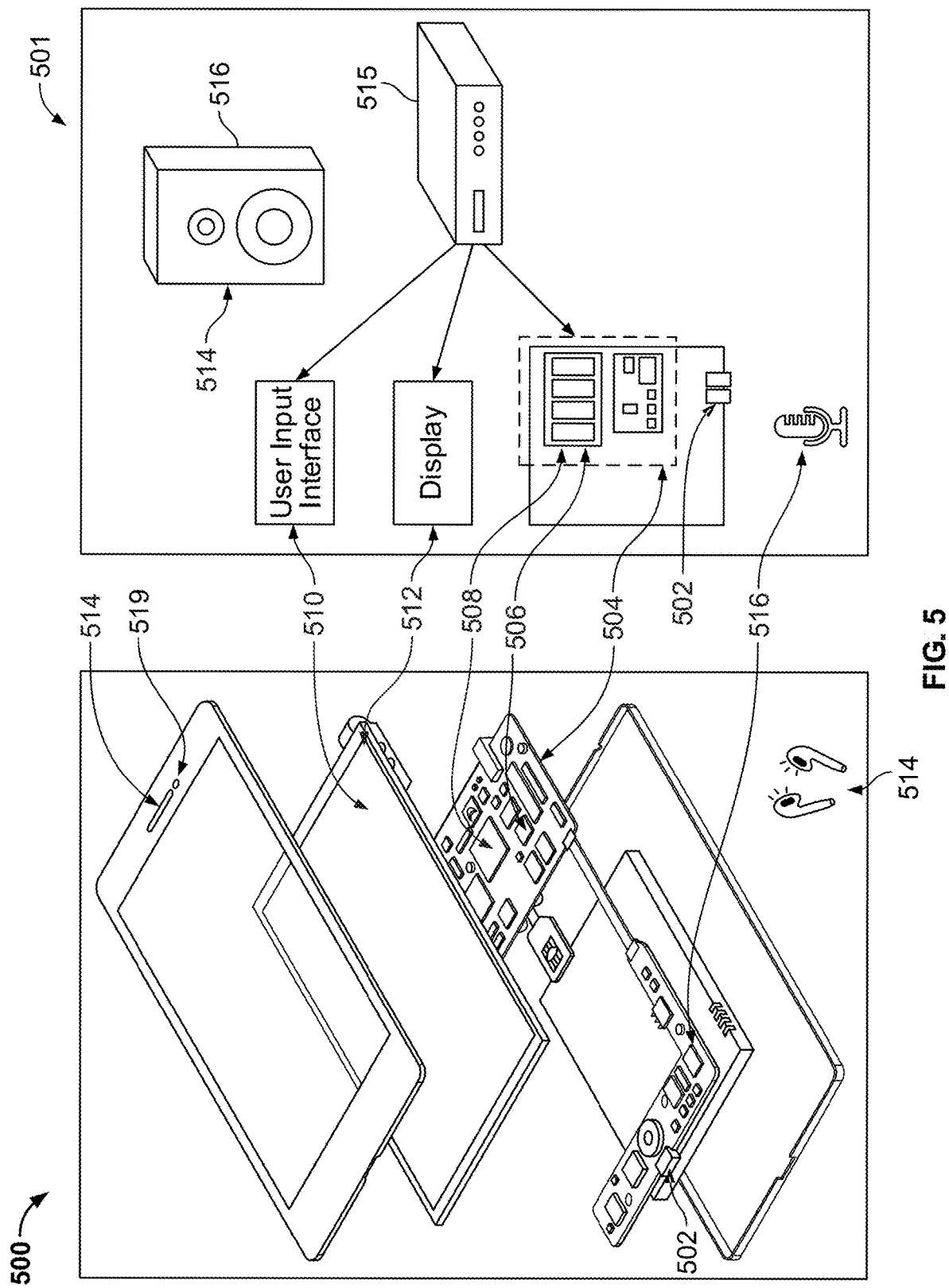
FIGS. 5-6 show illustrative devices, systems, servers, and related hardware for processing censored media, in accordance with some embodiments of the present disclosure.
Figure 6:
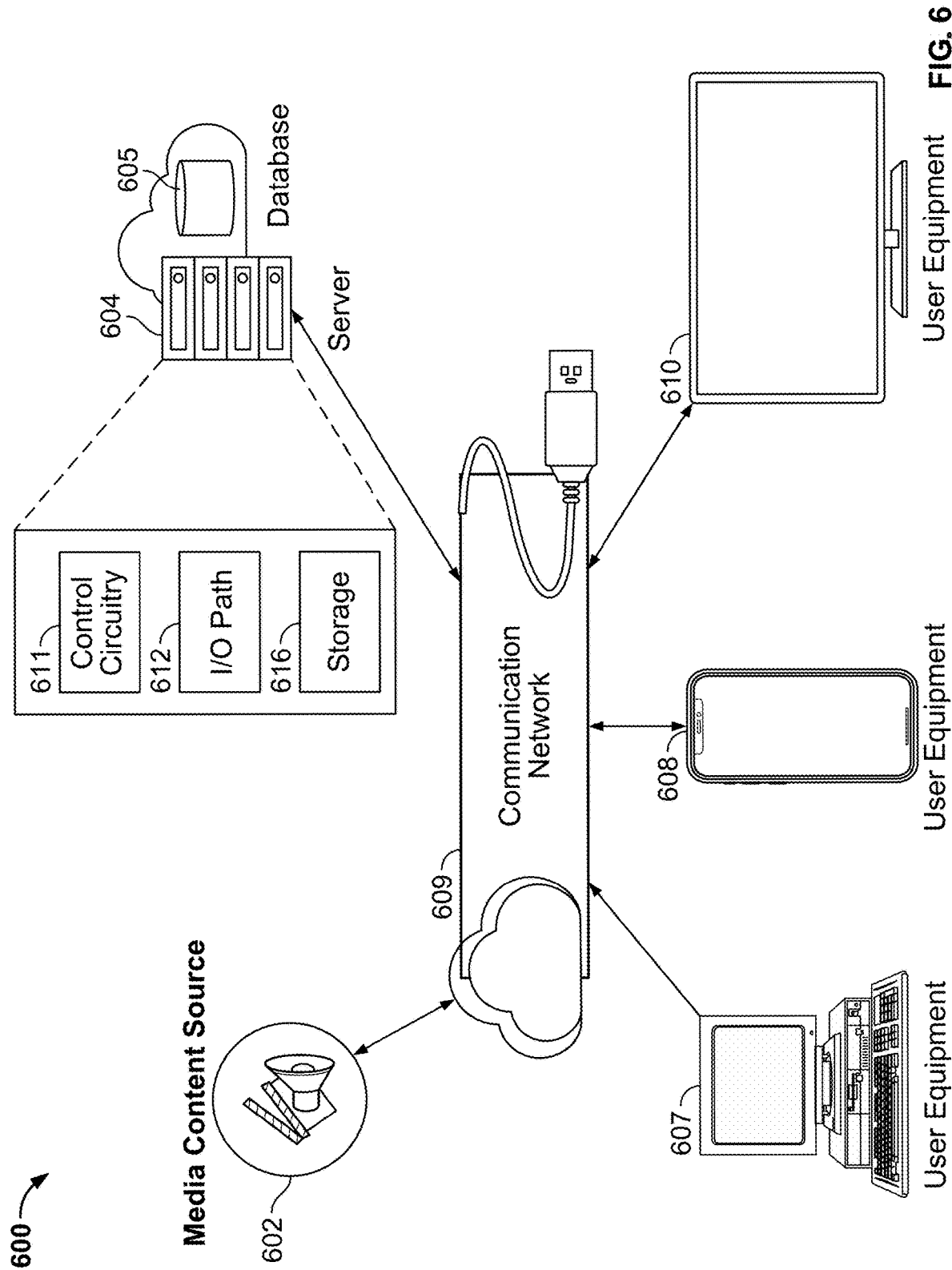

FIGS. 5-6 describe illustrative devices, systems, servers, and related hardware, in accordance with some embodiments of the present disclosure. FIG. 5 shows generalized embodiments of illustrative user devices 500 and 501, which may correspond to, e.g., client device 124 of FIG. 1 and FIG. 2. For example, user device 500 may be a smartphone device, a tablet, a near-eye display device, a VR device, or any other suitable device capable of processing censored media, e.g., locally or over a communication network. In another example, user device 501 may be a user television equipment system or device. User device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a user conducting a voice search. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 6. In some embodiments, device 500 comprises a rechargeable battery that is configured to provide power to the components of the device.

Each one of user device 500 and user device 501 may receive content and data via input/output (I/O) path 502. I/O path 502 may provide content (e.g., broadcast programming, on-demand programming, internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the censored media processing application stored in memory (e.g., storage 508). Specifically, control circuitry 504 may be instructed by the censored media processing application to perform the functions discussed above and below. In some implementations, processing or actions performed by control circuitry 504 may be based on instructions received from the censored media processing application.

In client/server-based embodiments, control circuitry 504 may include communications circuitry suitable for communicating with a server or other networks or servers. The censored media processing application may be a stand-alone application implemented on a device or a server. The censored media processing application may be implemented as software or a set of executable instructions. The instructions for performing any of the embodiments discussed herein of the censored media processing application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the censored media processing application may be a client/server application where only the client application resides on device 500 (e.g., client device 124 of FIG. 1), and a server application resides on an external server (e.g., server 604 and/or media content source 602). For example, the censored media processing application may be implemented partially as a client application on control circuitry 504 of device 500 and partially on server 604 as a server application running on control circuitry 611. Server 604 may be a part of a local area network with one or more of devices 500, 501 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 604 and/or an edge computing device), referred to as "the cloud." Device 500 may be a cloud client that relies on the cloud computing capabilities from server 604. In some embodiments, server 604 may be the same server as server 122 of FIG. 1A.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 6). In addition, communications circuitry may include circuitry that enables peer-to-peer communication of user devices, or communication of user devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as censored media processing application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or MPEG-4 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 504 may also include scaler circuitry for upconverting and downconverting content into the preferred output format of user device 500. Control circuitry 504 may also include digital-to-analog converter circuitry and analog-to-digital converter circuitry for converting between digital and analog signals. The tuning and encoding circuitry may be used by user device 500, 501 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user device 500 and user device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504.

The censored media processing application may be implemented using any suitable architecture. For example, it may be a stand-alone application wholly implemented on each one of user device 500 and user device 501. In such an approach, instructions of the application may be stored locally (e.g., in storage 508), and data for use by the application is downloaded on a periodic basis (e.g., from an out-of-band feed, from an internet resource, or using another suitable approach). Control circuitry 504 may retrieve instructions of the application from storage 508 and process the instructions to provide video conferencing functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc., or any type of solid-state storage, for example, solid-state drives including, e.g., nonvolatile memory express protocols (NVMe), solid-state cards, solid-state modules, or embedded multimedia cards (EMMC).

Control circuitry 504 may allow a user to provide user profile information or may automatically compile user profile information. For example, control circuitry 504 may access and monitor network data, video data, audio data, processing data, participation data from a conference participant profile. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some approaches, the censored media processing application is a client/server-based application. Data for use by a thick or thin client implemented on each one of user device 500 and user device 501 may be retrieved on-demand by issuing requests to a server remote to each one of user device 500 and user device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the censored media processing application may be downloaded and interpreted or otherwise run by an interpreter or virtual machine (run by control circuitry 504). In some embodiments, the censored media processing application may be encoded in the ETV Binary Interchange Format (EBIF), received by control circuitry 504 as part of a suitable feed, and interpreted by a user agent running on control circuitry 504. For example, the censored media processing application may be an EBIF application. In some embodiments, the censored media processing application may be defined by a series of JAVA-based files that are received and run by a local virtual machine or other suitable middleware executed by control circuitry 504. In some of such embodiments (e.g., those employing MPEG-2, MPEG-4, HEVC or any other suitable digital media encoding schemes), censored media processing application may be, for example, encoded and transmitted in an MPEG-2 object carousel with the MPEG audio and video packets of a program.

FIG. 6 is a diagram of an illustrative system 600 for processing censored media, in accordance with some embodiments of this disclosure. User devices 607, 608, 610 (which may correspond to, e.g., client device 124 of FIG. 1) may be coupled to communication network 609. Communication network 609 may be one or more networks including the internet, a mobile phone network, mobile voice or data network (e.g., a 6G, 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 609.

System 600 may comprise media content source 602, one or more servers 604, and/or one or more edge computing devices. In some embodiments, the censored media processing application may be executed at one or more of control circuitry 611 of server 604 (and/or control circuitry of user devices 607, 608, 610 and/or control circuitry of one or more edge computing devices). In some embodiments, server 604 is server 122 of FIG. 1A. In some embodiments, the media content source and/or server 604 may be configured to host or otherwise facilitate video communication sessions between user devices 607, 608, 610 and/or any other suitable user devices, and/or host or otherwise be in communication (e.g., over network 609) with one or more social network services.

In some embodiments, server 604 may include control circuitry 611 and storage 614 (e.g., RAM, ROM, Hard Disk, Removable Disk, or any type of Solid-State storage, etc.). Storage 614 may store one or more databases. Server 604 may also include an I/O path 612. I/O path 412 may provide video conferencing data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 414 that is part of control circuitry 611.

Figure 7:
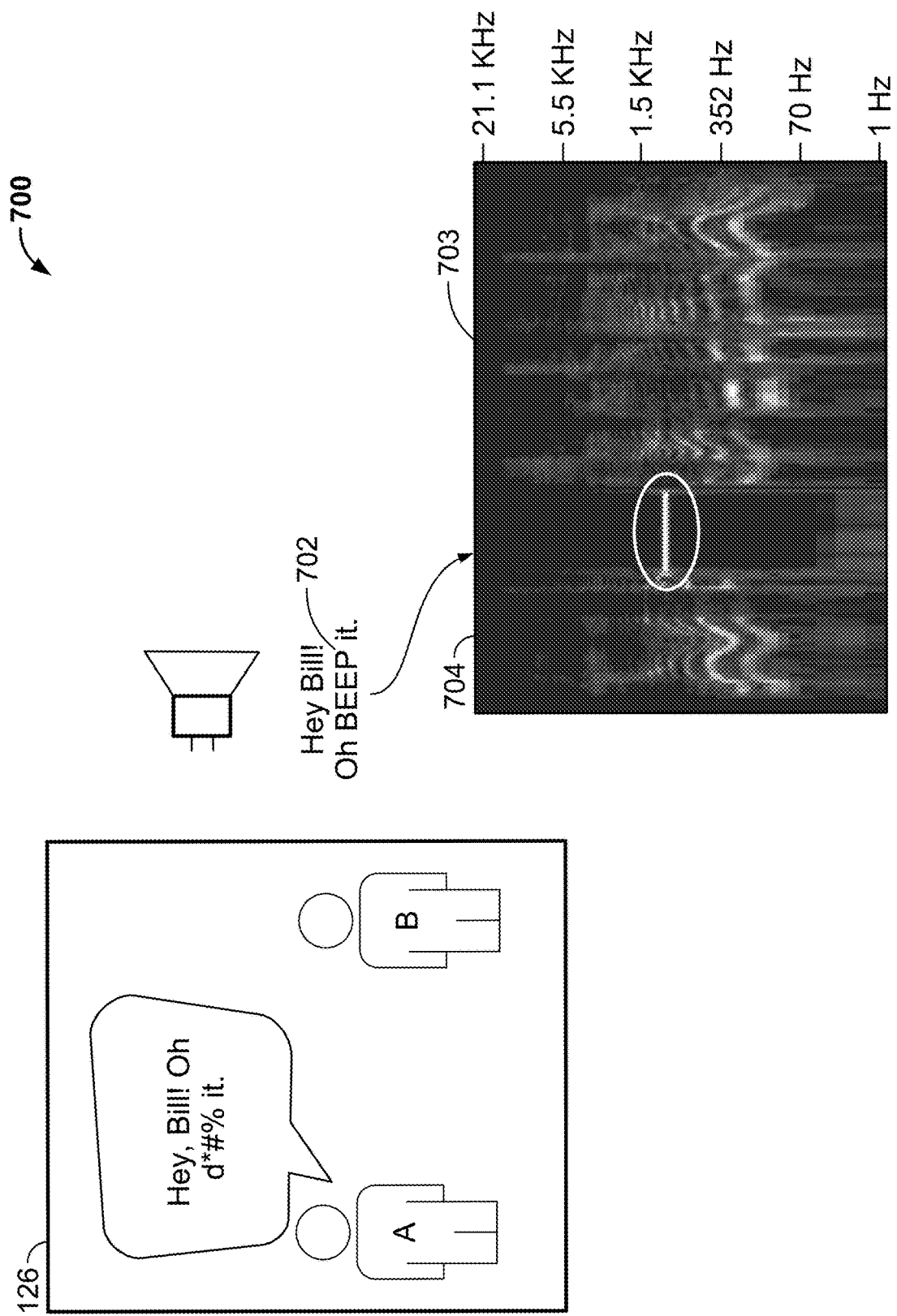
FIG. 7 is an illustrative example of a system for detecting a beep sound using methods fast Fourier transform (FFT), in accordance with some embodiments of the present disclosure.

FIG. 7 is an illustrative example of a system for detecting a beep sound using methods such as fast Fourier transform (FFT), in accordance with some embodiments of the present disclosure. In some embodiments, system 700 includes media stream 126 of FIGS. 1A and 1B, censor beep 702, spectrogram 703, and spectrogram censor beep depiction 704. In some embodiments, server 122 of FIG. 1A detects the presence of censor beep 702 using a fast Fourier transform (FFT) by identifying spectrogram censor beep depiction 704 on spectrogram 703.

Figure 8:
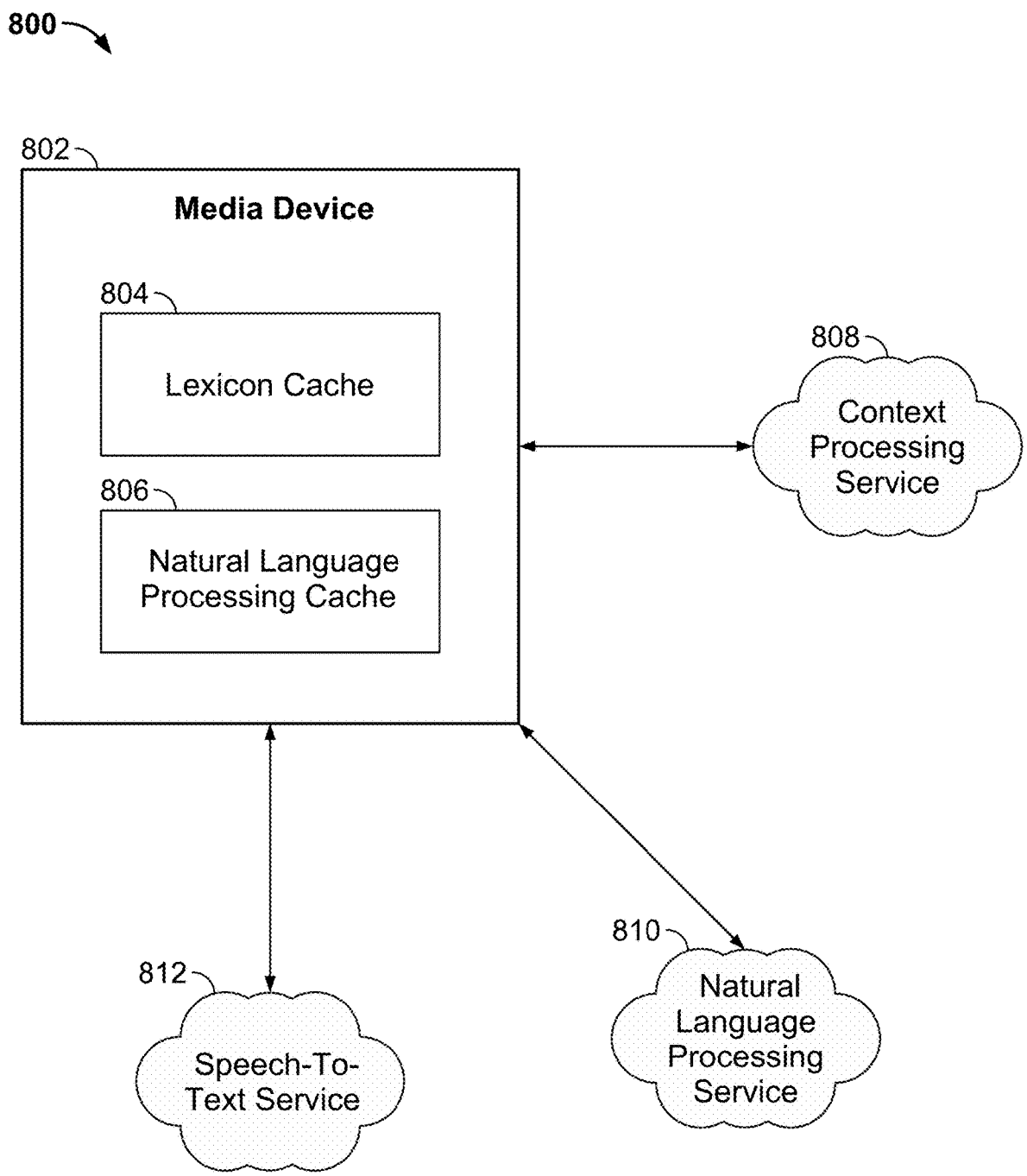
FIG. 8 is a block diagram illustrates an example system for identifying a censored word within the censored audio portion using natural language processing, in accordance with some embodiments of this disclosure.

FIG. 8 illustrates an example system 800 for identifying a censored word within the censored audio portion using natural language processing. In some embodiments, system 800 includes a media device 802, speech-to-text service 812, natural language processing service 810, and context processing service 808. Each of these devices and services are presented to clarify the functionalities described herein and may not be necessary to implement one or more embodiments. Furthermore, devices and services not shown in FIG. 8 may also be used to perform the functionalities described herein.

In an embodiment, media device 802 generally represents any media device comprising a processor and configured to present media content. A media device 802 may refer to a single device or any combination of devices (e.g., a set-top box cable receiver, an audio receiver, over the top (OTT) display devices, and a television set, etc.) that may be configured to present media content, and may correspond to, e.g., client device 124 of FIG. 1 and FIG. 2. In an embodiment, media device comprises device lexicon cache 804 and natural language processing cache 806, generally representing local and/or remote memory storage used to store data associated with the techniques described herein. In an embodiment, device lexicon cache 804 and/or natural language processing cache 806 may be integrated into media device 802 or may be remotely accessible.

In an embodiment, speech-to-text service 812 generally represents any software and/or hardware for translating audio data including one or more character's voice portions into a textual representation. In an embodiment, speech-to-text service 812 receives audio data representing censored portions, e.g., censored audio portion 130 as described above with reference to FIG. 1, and the words surrounding the censored portion in the character's voice from media device 802, translates the audio data into a textual representation, and provides the textual representation to a media device 802, for example, through a network, communication connection, any local network, etc.

In an embodiment, natural language processing service 810 generally represents any service that is enabled to process text using one or more natural language processing techniques including parsing the text and categorizing the parsed text into one or more natural language components. In an embodiment, natural language processing service 810 receives textual data (e.g., from media device 802, speech-to-text service 812, etc.), performs one or more natural language processing techniques using the textual data as input, and provides the identified censored word as text. The results may include various transformations to the input text, for example, the filtering of certain words and/or other modifications based on the applied natural language processing techniques.

In an embodiment, context processing service 808 generally processes the context of a media stream from which an audio portion is being used for natural language processing. In an embodiment, natural language processing service 810 receives contextual data from context processing service 808 to modify the applied natural language processing techniques.

In an embodiment, one or more of speech-to-text service 812, natural language processing service 810, and context processing service 808 represent remote services that media device 802 communicates with over a network (e.g., internet, intranet, world wide web, etc.). In another embodiment, media device 802 comprises one or more of the services. In another embodiment, one or more of the services may be combined with one or more of the other services.

In an embodiment, the media device 802 connects to a computer network via a network device (e.g., a cable modem, satellite modem, telephone modem, fiber optic modem, etc.) that may be separate from the media device 802. In an example, the media device 802 is communicatively coupled, through wireless and/or wired segments, to a network device which sends and/or receives data for the media device 802.

Figure 9:
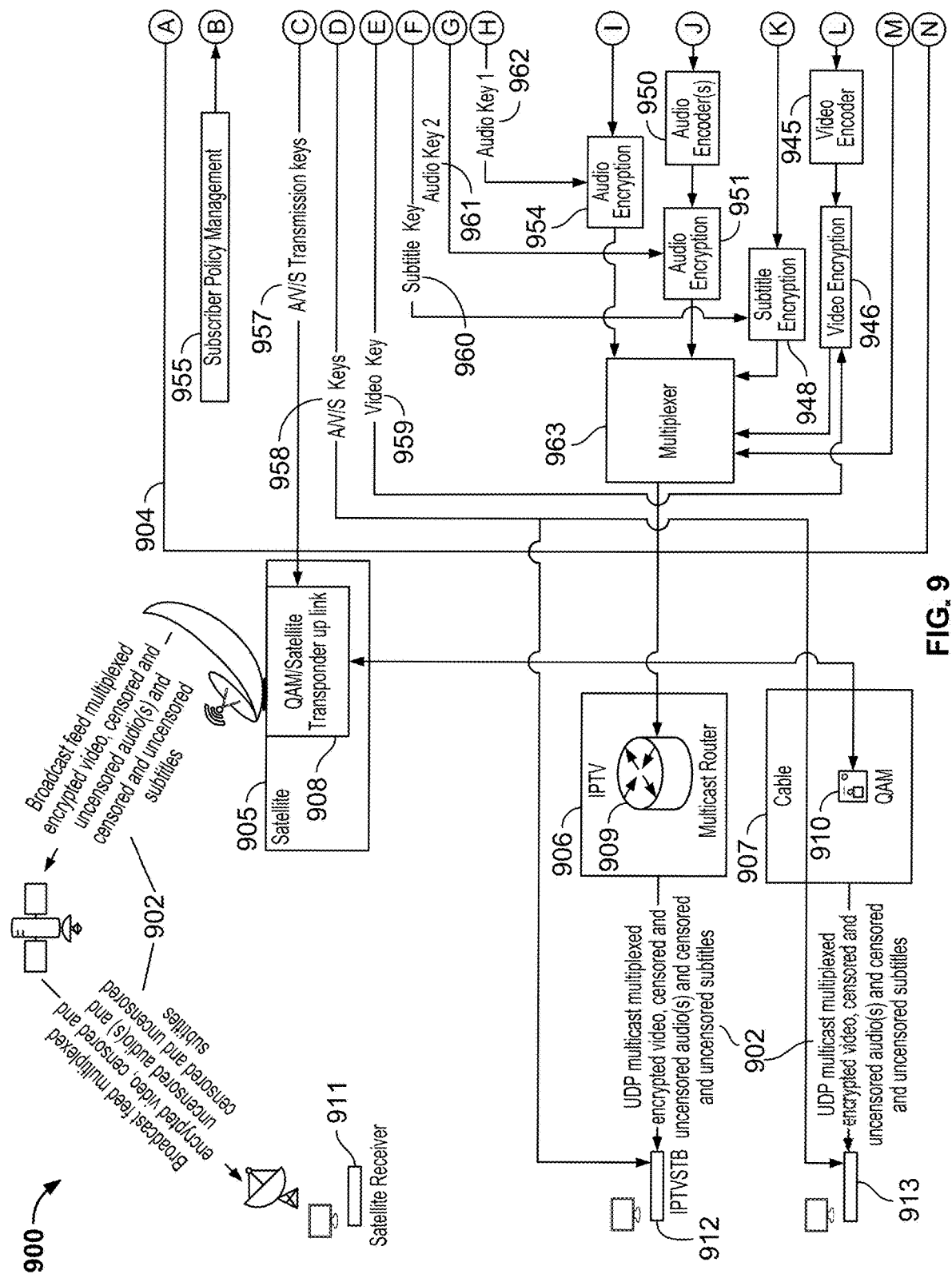
FIG. 9 is an architecture example of an IPTV, cable or satellite provider's system processing censored media, in accordance with some embodiments of the present disclosure.
Figure 9:
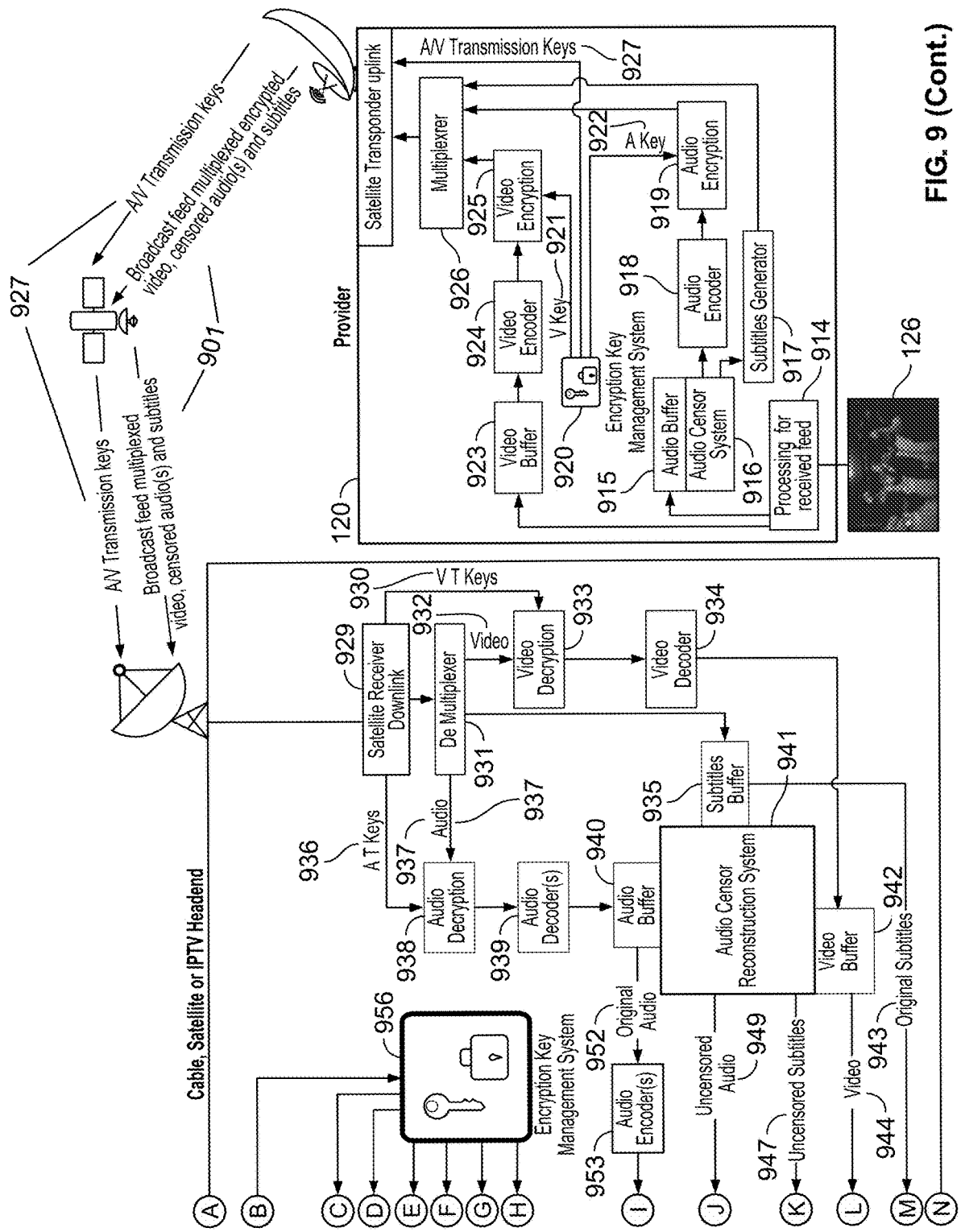

FIG. 9 is an architecture example of an IPTV, Cable or Satellite provider's system 900 for processing censored media, in accordance with some embodiments of the present disclosure. In some embodiments, system 900 includes provider 120 of FIGS. 1A and 1B, censored media stream 126 of FIGS. 1A and 1B, cable/satellite/IPTV headend 904 (hereinafter referred to as headend 904), satellite operator 905, satellite receiver 911, IPTV operator 906, IPTV STB 912, cable operator 907, and cable STB 913. Each of these devices and services are presented to clarify the functionalities described herein and may not be necessary to implement one or more embodiments. Furthermore, devices and services not shown in FIG. 9 may also be used to perform the functionalities described herein.

In one approach, provider 120 processes censored media stream 126 through the processing for receiving feed 914. In some approaches, provider 120 then processes the audio portion of censored media stream 126 through audio buffer 915 and audio censor system 916 to buffer the audio of the media stream and to censor any obscenities. In some embodiments, after provider 120 processes censored media stream 126 through audio censor system 916, provider 120 then processes censored media stream 126 through audio encoder 918 and subtitles generator 917 to encode the audio of the media stream and the generate subtitles. In some embodiments, provider 120 then sends the generated subtitles to multiplexer 926. In some embodiments, provider 120 then sends the encoded audio to audio encryption system 919 to become encrypted. In some embodiments, provider 120 sends A key 922 from encryption key management system 920 to audio encryption system 919. In some embodiments, provider 120 then sends the encoded audio to audio encryption system 919 to be encrypted. In some embodiments, provider 120 then sends the encrypted audio to multiplexer 926.

In some approaches, after censored media stream 126 goes through the processing for receiving feed 914 at provider 120, provider 120 processes the video portion of censored media stream 126 through video buffer 923 to buffer the video portion of the media stream. In some embodiments, provider 120 then sends the buffered video portion to video encoder 924 to encode the buffered video portion. In some embodiments, provider 120 then sends the encoded buffered video portion to video encryption system 925. In some embodiments, provider 120 sends V key 921 from encryption key management system 920 to video encryption system 925. In some embodiments, provider 120 then encrypts the encoded buffered video portion with the V key 921 at video encryption system 925, and then sends the encrypted video portion to multiplexer 926.

In some embodiments, at multiplexer 926, provider 120 processes the encrypted video portion, the encrypted audio portion, and the encrypted subtitles into multiplex broadcast feed 901.

In some embodiments, provider 120 also sends A/V transmission keys 927 from encryption key management system 920 to the provider's satellite transponder uplink 928. In some embodiments, provider 120 then sends A/V Transmission keys 927 and the multiplexed video, censored audio, and subtitles through broadcast feed 901 to headend 904. In some embodiments, the multiplexed stream is encrypted, but the video and audio streams are sent separately and are not encrypted. In this case, there is a separate transmission key for the multiplex stream. Further, in this case, the receiver side will receive a key to decrypt the multiplexed stream.

In some embodiments, after headend 904 receives A/V Transmission keys 927 and the multiplexed video, censored audio, and subtitles through broadcast feed 901, headend 904 processes broadcast feed 901 through satellite receiver downlink 929. In some embodiments, headend 904 then sends broadcast feed 901 to de-multiplexer 931, where it separates broadcast feed 901 into its video portion 932 and its audio portion 937.

In some embodiments, headend 904 sends the video portion 932 to video decryption system 933, and also sends VT keys 930 from satellite receiver downlink 929 to video decryption system 933, where the video portion 932 is decrypted. In some embodiments, headend 904 then sends the decrypted video portion to video decoder 934, where it is decoded, and then headend 904 sends the decoded video portion to video buffer 942.

In some implementations, headend 904 sends the audio portion 937 to audio decryption system 938, where the audio portion 937 is decrypted. In some embodiments, headend 904 then sends the decrypted audio portion to audio decoder(s) 939, where it is decoded, and then headend 904 sends the decoded audio portion to audio buffer 940. In some embodiments, headend 904 sends broadcast feed 901 from de-multiplexer 931 to subtitles buffer 935.

In some approaches, audio buffer 940, subtitles buffer 935, and video buffer 942 all feed into audio censor reconstruction system 941, where video and audio received is decrypted, decoded, and stored in the rolling buffer of audio censor reconstruction system 941, and where subtitles are extracted and stored in the rolling buffer of audio censor reconstruction system 941. In some embodiments, audio censor reconstruction system 941 performs the analysis of streams to identify censorship spots.

In one approach, once a censorship spot has been identified, processing takes place for regeneration of the censored audio and subtitle content. In some embodiments, audio censor reconstruction system 941 sends the video to the video encoder, the original audio to an audio encoder and the processed uncensored stream to an audio encoder, as described further below. In some embodiments, the transmission of these streams is synchronized at the proper times for transmission to the appropriate encoders. In some embodiments, the encoders, including multiplexer 963, can be part of an integrated software or hardware encoding system.

In some implementations, headend 904 sends policies for each subscriber from subscriber policy management system 955 to encryption key management system 956. In some embodiments, headend 904 sends subtitle key 960 from encryption key management system 956 to subtitle encryption system 948. In some embodiments, headend 904 also sends audio key 1 962 t from encryption key management system 956 to audio encryption system 954. In some embodiments, headend 904 also sends audio key 2 961 from encryption key management system 956 to audio encryption system 951. In some embodiments, headend 904 also sends video key 959 from encryption key management system 956 to video encryption system 946. In some embodiments, based on policy, the same key used for original audio may be used for the uncensored audio. In other cases, there may be a policy defined where the uncensored audio may require another key separate from the original audio based on laws or a subscriber service agreement in an upsell service. In the case of different policies, another key may be provided to the uncensored audio stream allowing only customers whose policy allows for viewing the broadcast content and hearing the processed/uncensored stream access to that audio content.

In some implementations, headend 904 sends original subtitles 943 from subtitles buffer 935 to multiplexer 963. In some embodiments, headend 904 processes broadcast feed 901 through subtitles buffer 935 and through audio censor reconstruction system 941 to produce uncensored subtitles 947. In some embodiments, headend 904 then sends uncensored subtitles 947 to subtitle encryption system 948, where the uncensored subtitles are encrypted with subtitle key 960. In some embodiments, headend 904 then sends the encrypted uncensored subtitles to multiplexer 963.

In one approach, headend 904 processes the decoded audio portion through audio buffer 940 to output original audio 952 and send original audio 952 to audio encoder(s) 953. In some embodiments, headend 904 then sends the encoded audio to audio encryption system 954. In some embodiments, at audio encryption system 954, headend 904 encrypts the encoded original audio portion with audio key 1 962 and sends it to multiplexer 963.

In some embodiments, headend 904 processes the decoded audio portion through audio buffer 940 and through audio censor reconstruction system 941 to produce uncensored audio 949. In some embodiments, headend 904 then sends uncensored audio 949 to audio encoder(s) 950 for encoding, and then to audio encryption system 951 for encryption. In some embodiments, at audio encryption system 951, headend 904 encrypts the encoded uncensored audio portion with audio key 2 961 and sends it to multiplexer 963.

In some embodiments, headend 904 processes the decoded video portion through video buffer 942, where video 944 is outputted and sent to video encoder(s) 945. In some embodiments, headend 904 then sends the encoded video to video encryption system 946. In some embodiments, at video encryption system 946, headend 904 encrypts the encoded original audio portion with video key 959 and sends it to multiplexer 963.

In some embodiments, at multiplexer 963, headend 904 processes the encrypted video portion, the encrypted original audio portion, the encrypted uncensored audio portion, the encrypted original subtitles, and the encrypted uncensored subtitles, into multiplexed broadcast feed 902. In some embodiments, multiplexed broadcast feed 902 is a single program transport stream. In some embodiments, multiplexed broadcast feed 902 is a multi-program transport stream.

In some embodiments, headend 904 sends A/V/S transmission keys 957 from encryption key management system 956 along with multiplexed broadcast feed 902, from multiplexer 963, to QAM/satellite transponder uplink 908 within satellite operator 905. In some embodiments, upon receiving multiplexed broadcast feed 902, satellite operator 905 transmits multiplex broadcast feed 902 to satellite receiver 911. In some embodiments, the subscriber receiving multiplex broadcast feed 902 has the ability to decrypt and render all audio, video, and subtitles. In some embodiments, if there is a separate policy for the uncensored audio and subtitle streams and the subscriber has access to that content, the uncensored audio and subtitle streams can be viewed as an option based on a user selection using the receiver.

In some embodiments, headend 904 sends A/V/S keys 958 from encryption key management system 956 to IPTV STB 912 directly over the IPTV network. In some embodiments, headend 904 also sends multiplexed broadcast feed 902 from multiplexer 963 to multicast router 909 within IPTV operator 906. In some embodiments, upon receiving multiplexed broadcast feed 902, IPTV operator 906 broadcasts multiplexed broadcast feed 902 to IPTV STB 912 as UDP on the appropriate address: port for that service/channel. In some embodiments, the subscriber receiving the multiplex stream has the ability to decrypt and render all the audio, video, and subtitles. In some embodiments, when there is a separate policy for the uncensored audio and subtitle streams and the subscriber has access to that content, the uncensored audio and subtitle streams may be viewed as an option based on the user selection using IPTV STB 912.

In some embodiments, headend 904 sends A/V/S keys 958 from encryption key management system 956 to cable STB 913 directly over the cable network. In some embodiments, the keys are sent as out of band updates to cable STB 913. In some embodiments, headend 904 also sends multiplexed broadcast feed 902 from multiplexer 963 to QAM 910 within cable operator 907. In some embodiments, upon receiving multiplexed broadcast feed 902, cable operator 907 sends multiplexed broadcast feed 902 to cable STB 913, and cable operator 907 broadcasts the multiplexed broadcast feed 902 as UDP on the appropriate frequency as defined for that service/channel. In some embodiments, the subscriber receiving the multiplex stream has the ability to decrypt and render all the audio, video and subtitles. In some embodiments, when there is a separate policy for the uncensored audio and subtitle streams and the subscriber has access to that content, the uncensored audio and subtitle streams may be viewed as an option based on the user selection using the cable STB 913.

Figure 10:
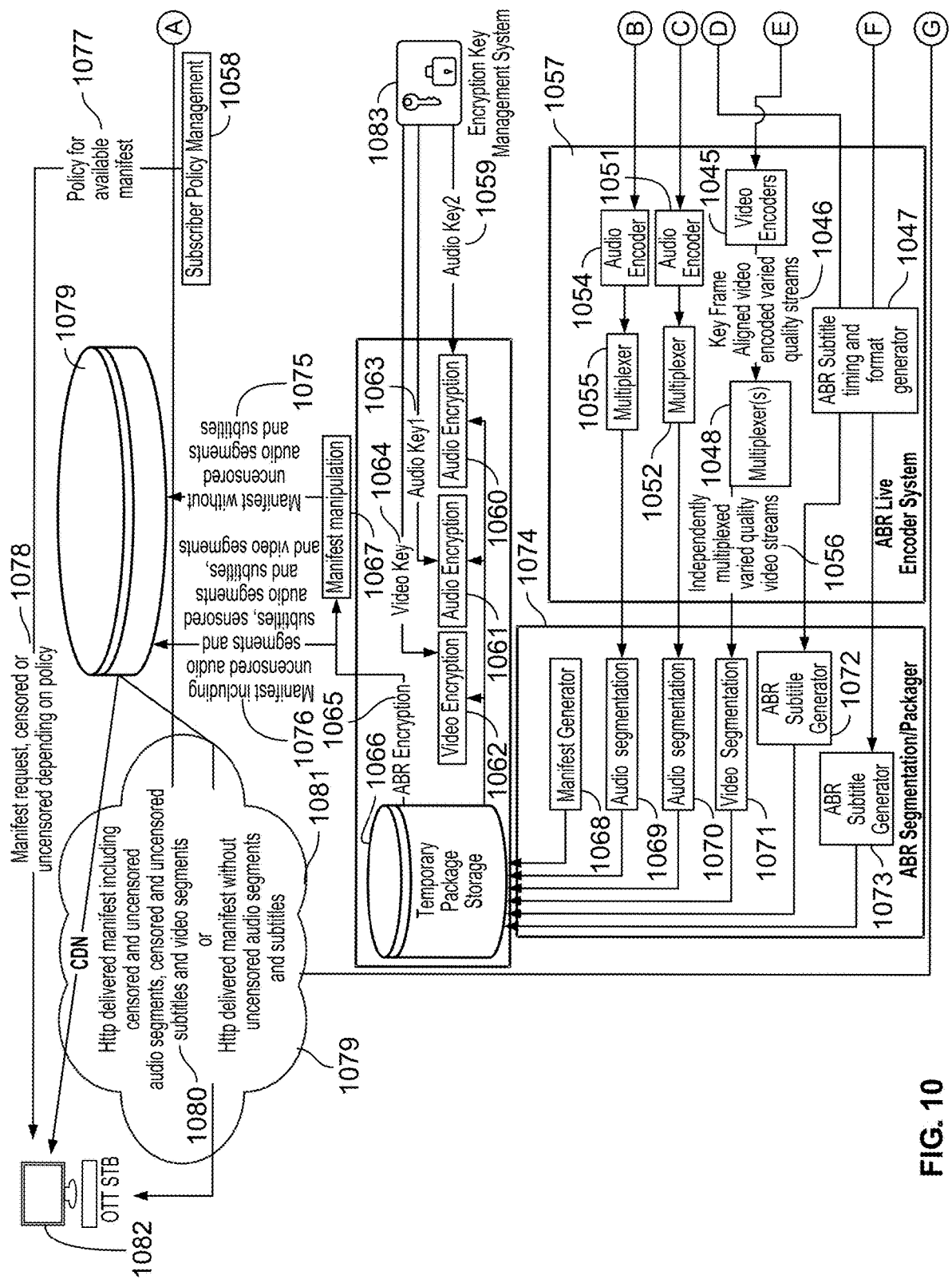
FIG. 10 is an architecture example of an OTT provider's system processing censored media, in accordance with some embodiments of the present disclosure.
Figure 10:
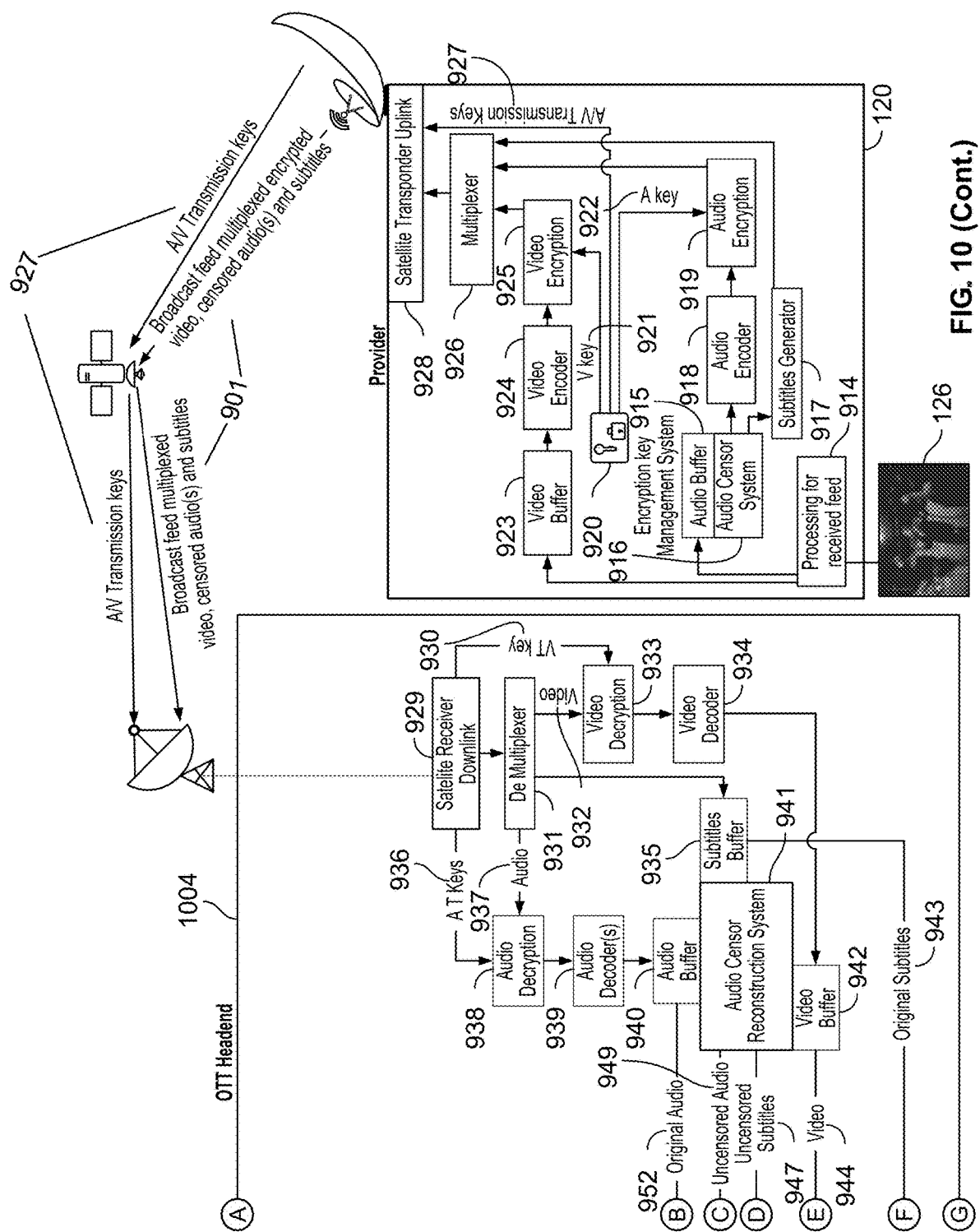

FIG. 10 is an architecture example of an over-the-top (OTT) provider's system processing censored media, in accordance with some embodiments of the present disclosure. In some embodiments, system 900 includes provider 120 of FIGS. 1A and 1B, censored media stream 126 of FIGS. 1A and 1B, OTT headend 1004, adaptive bitrate (ABR) live encoder system 1057, ABR segmentation/packager system 1074, ABR encryption system 1065, content delivery network (CDN) 1079, and OTT set-top box (STB) 1082. Each of these devices and services are presented to clarify the functionalities described herein and may not be necessary to implement one or more embodiments. Furthermore, devices and services not shown in FIG. 10 may also be used to perform the functionalities described herein.

In some embodiments, the receiving and processing for OTT is identical to the architecture within FIG. 9 up to the multiplexing operation.

In some embodiments, OTT headend 1004 sends video key 1064 from encryption key management system 1083 to video encryption system 1062 within ABR encryption system 1065. In some embodiments, OTT headend 1004 sends audio key 1 1063 from encryption key management system 1083 to audio encryption system 1061 within ABR encryption system 1065. In some embodiments, OTT headend 1004 sends audio key 2 1059 from encryption key management system 1083 to audio encryption system 1060 within ABR encryption system 1065.

In some embodiments, ABR live encoder system 1057 encodes and multiplexes video streams in varying quality, encodes the original censored audio and the processed uncensored audio, as described further below. In some embodiments, The ABR live encoder system 1057 also receives both the censored and processed uncensored subtitles and generates subtitles in the appropriate format with proper timing information related to the audio streams. In some embodiments, these streams and subtitle data are sent to the ABR segmentation/packager system 1074 which generates a live manifest representing the ABR package, which is continuously updated, as described further below. In some embodiments, the data is written to temporary package storage 1066 for the ABR encryption, as described further below. In some embodiments, as the segments are encrypted, the manifest file is updated with the encrypted data for the client to decrypt the ABR package content. In some embodiments, as the encryption of the content segments complete, the encrypted segments along with the generated manifest is sent to CDN 1079 for retrieval by OTT STB 1082. In some embodiments, a manifest manipulator modifies the manifest to remove the uncensored audio and subtitle content. In some embodiments, the manipulated manifest is written to CDN 1079 for retrieval by the OTT clients, as described further below. In some embodiments, the subscriber policy management system sends policies for each subscriber to the OTT operator, as described further below. In some embodiments, depending on policy, the client device may retrieve the manifest with the video, audio segments and subtitles for the original broadcast or may retrieve the manifest containing the original content plus the processed uncensored audio and video streams. In some embodiments, when policy permits, the subscriber's device has the option to play the original censored audio and subtitle content or the processed/uncensored audio and subtitle content.

In some embodiments, OTT headend 1004 sends original audio 952 from audio buffer 940 to audio encoder 1054, and then to multiplexer 1055 within ABR live encoder system 1057. In some embodiments, OTT headend 1004 then sends the multiplexed encoded original audio to audio segmentation system 1069 within ABR segmentation/packager system 1074 for segmentation, and then sends the segmented audio to temporary package storage 1066 within ABR encryption system 1065. In some embodiments, OTT headend 1004 then sends the segmented audio from temporary package storage 1066 to be encrypted with audio key 1 1063 at audio encryption system 1061 within ABR encryption system 1065, and then sends the encrypted original audio back to temporary package storage 1066 within ABR encryption system 1065.

In some embodiments, OTT headend 1004 sends uncensored audio 949 from audio censor reconstruction system 941 to audio encoder 1051, and then to multiplexer 1052 within ABR live encoder system 1057. In some embodiments, OTT headend 1004 then sends the multiplexed encoded uncensored audio to audio segmentation system 1070 within ABR segmentation/packager system 1074 for segmentation, and then sends the segmented audio to temporary package storage 1066 within ABR encryption system 1065. In some embodiments, OTT headend 1004 then sends the segmented audio from temporary package storage 1066 to be encrypted with audio key 2 1059 at audio encryption system 1060 within ABR encryption system 1065, and then sends the encrypted uncensored audio back to temporary package storage 1066 within ABR encryption system 1065.

In some embodiments, OTT headend 1004 sends uncensored subtitles from audio censor reconstruction system 941 to ABR subtitle timing and format generator 1047 within ABR live encoder system 1057. In some embodiments, OTT headend 1004 then sends the uncensored subtitles to ABR subtitle generator system 1072 within ABR segmentation/packager system 1074, and then sends the resulting packaged subtitles to temporary package storage 1066 within ABR encryption system 1065. In some embodiments, OTT headend 1004 sends original subtitles 943 from subtitles buffer 935 to ABR subtitle timing and format generator 1047 within ABR live encoder system 1057. In some embodiments, OTT headend 1004 then sends the uncensored subtitles to ABR subtitle generator system 1073 within ABR segmentation/packager system 1074, and then sends the resulting packaged subtitles to temporary package storage 1066 within ABR encryption system 1065.

In some implementations, OTT headend 1004 sends video 944 from video buffer 942 to video encoders 1045 to produce key frame aligned video encoded varied quality streams 1046, which OTT headend 1004 then sends to multiplexer 1048 to produce independently multiplexed varied quality video streams 1056, all within ABR live encoder system 1057. In some embodiments, OTT headend 1004 then sends independently multiplexed varied quality video streams 1056 to video segmentation system 1071 within ABR segmentation/packager system 1074, and then sends the resulting segmented video to temporary package storage 1066 within ABR encryption system 1065. In some embodiments, OTT headend 1004 then sends the segmented video from temporary package storage 1066 to be encrypted with video key 1064 at video encryption system 1062 within ABR encryption system 1065, and then sends the encrypted video back to temporary package storage 1066 within ABR encryption system 1065.

In some embodiments, OTT headend 1004 generates a manifest at manifest generator 1068 within ABR segmentation/packager system 1074 and sends it to temporary package storage 1066 within ABR encryption system 1065.

In some embodiments, OTT headend 1004 then sends the manifest, the encrypted video, the encrypted original audio, and the encrypted uncensored audio from temporary package storage 1066 to manifest manipulation 1067. In some embodiments, OTT headend 1004 sends a manifest without uncensored audio segments and subtitles 1075 to CDN 1079, as well as a manifest including uncensored audio segments and subtitles, censored audio segments and subtitles, and video segments 1076 to CDN 1079.

In some implementations, OTT headend 1004 also sends policies for available manifest 1078 for each subscriber from subscriber policy management system 1058 to the OTT operator corresponding to OTT STB 1082. In some embodiments, after receiving manifest without uncensored audio segments and subtitles 1075 and manifest including uncensored audio segments and subtitles, censored audio segments and subtitles, and video segments 1076, CDN 1079 delivers HTTP manifest including censored and uncensored audio segments, censored and uncensored subtitles, and video segments 1080 to OTT STB 1082. In some embodiments, after receiving manifest without uncensored audio segments and subtitles 1075 and manifest including uncensored audio segments and subtitles, censored audio segments and subtitles, and video segments 1076, CDN 1079 delivers HTTP manifest without uncensored audio segments and subtitles 1081 to OTT STB 1082. In some embodiments, the HTTP manifest that gets delivered depends on manifest request (censored or uncensored depending on policy) 1078.

Figure 11:
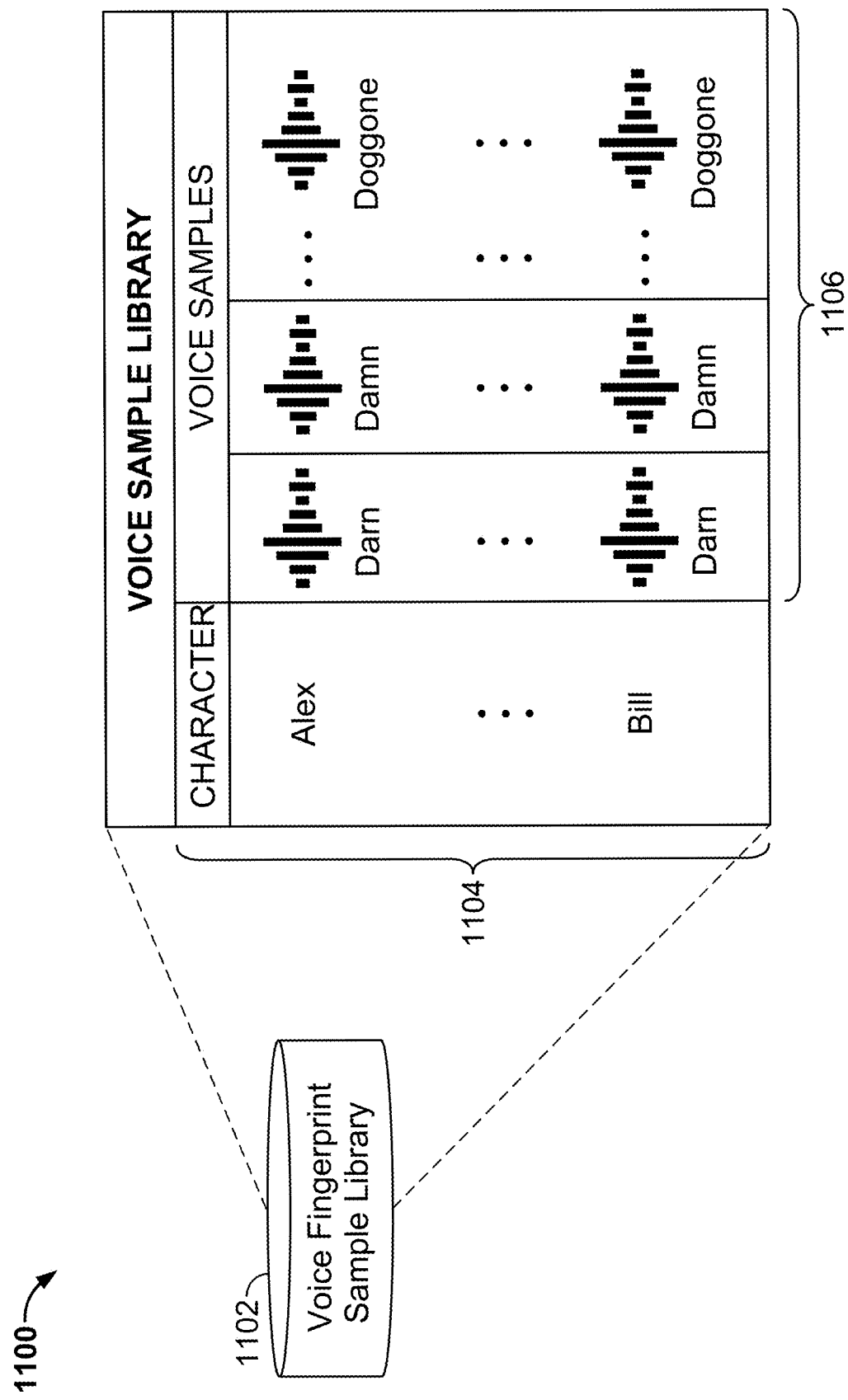
FIG. 11 is an illustrative example of a system for storing voice samples for processing censored media, in accordance with some embodiments of the present disclosure.

FIG. 11 is an illustrative example of a system for storing voice samples for processing censored media, in accordance with some embodiments of the present disclosure. In some embodiments, system 1100 includes voice fingerprint sample library 1102, character names 1104, and character's voice samples 1106.

In some embodiments, character's voice samples 1106 are voice samples for characters saying different commonly censored words, e.g., darn, damn, doggone. In some embodiments, character names 1104 may include the name of character 134 of FIGS. 1A and 1B, and the corresponding voice sample of character's voice samples 1106 may be voice samples of character 134. In some embodiments, character's voice samples 1106 are voice samples from characters from a media stream currently being processed, e.g., media stream 126 of FIGS. 1A and 1B, or voice samples from characters from other media streams, for example, episodes from the same television series, movies from the same trilogy/series of films, or even any media streams featuring the same actor as the character. In some embodiments, character's voice samples 1106 are used to synthesize the uncensored audio portion of media streams, e.g., uncensored audio portion of the media stream 312, as described above with reference to FIG. 3. For example, character's voice samples 1106 may be used to synthesize the uncensored audio portion of media streams when a character's first onscreen word is censored, and the server, e.g., server 122 has not yet had the chance to build and maintain a character buffer, e.g., character buffer 136 of FIGS. 1A and 1B, for the character, e.g., character 134 of FIGS. 1A and 1B (described above). In some embodiments, character's voice samples 1106 are modified based on, for example, words said by other characters, conversational context, facial analysis of characters within the media stream, emotional analysis of characters within the media stream, or any other form of contextual analysis in order to synthesize the uncensored audio portion of media streams to produce the identified censored word in the correct tone. In some embodiments, character's voice samples 1106 are modified by a model that infers tone based on situations trained on video feeds, e.g., synthesizer machine learning model 302 of FIG. 3.

Figure 12:
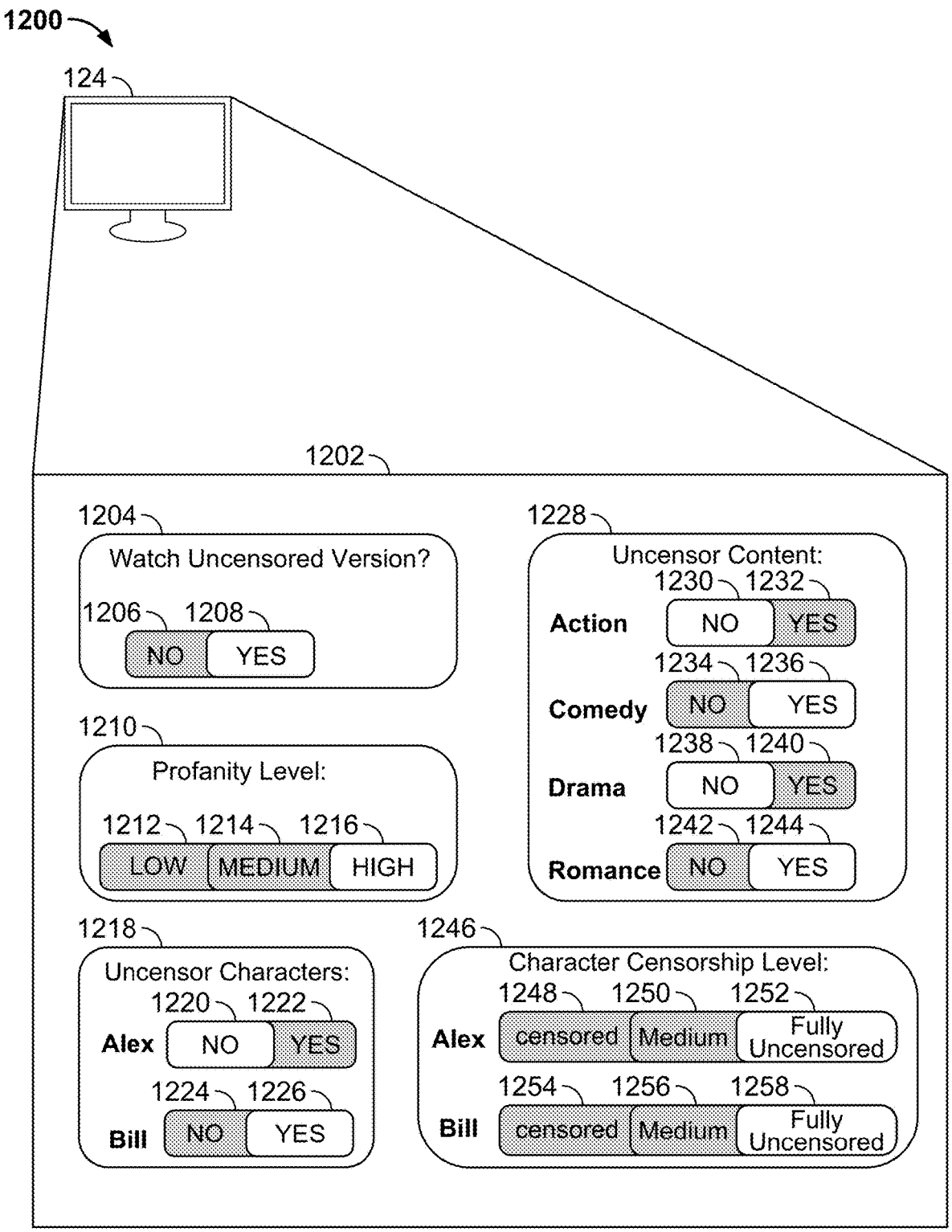
FIG. 12 is an illustrative example of a user interface system for processing censored media, in accordance with some embodiments of the present disclosure.

FIG. 12 is an illustrative example of a user interface system for processing censored media, in accordance with some embodiments of the present disclosure. System 1200 includes client device 124 of FIG. 1A. In some embodiments, the user interface features of system 1200 are populated by the server of FIG. 1A. In some embodiments, the user interface features of system 1200 are populated by client device 170 of FIG. 1B, and client device 124 is client device 170 of FIG. 1B. In some embodiments, the user interface features of system 1200 are populated in connection with a currently streaming media stream, e.g., media stream 126 of FIG. 1A. In some embodiments, the user interface features of system 1200 are applied globally to device and apply to all media streams viewed on that device.

In one approach, the server populates a user interface options screen 1202 on client device 124. In some implementations, user interface options screen 1202 includes "Watch Uncensored Version?" toggle box 1204 with toggle option "No" 1206 and toggle option "Yes" 1208. In some embodiments, upon receiving user selection of toggle option "Yes" 1208, the server, proceeds to uncensor the media stream currently being processed by the server. As used within this description, to "uncensor" is to create uncensored content. In some embodiments, upon receiving user selection of toggle option "No" 1206, the server leaves the media stream currently being processed by the server in its censored form.

In some embodiments, user interface options screen 1202 includes "Profanity Level:" toggle box 1204 with toggle option "Low" 1212, toggle option "Medium" 1214, and toggle option "High" 1216. In some embodiments, upon receiving user selection of toggle option "Low" 1212, the server determines replacement words for all censored content, as described above in Table 1 with reference to FIG. 1, for the media stream currently being processed by the server. In some embodiments, upon receiving user selection of toggle option "Medium" 1214, the server determines replacement words for some more obscene censored content, as described above in Table 1 with reference to FIG. 1, and uncensor the milder censored content within the media stream currently being processed by the server. In some embodiments, upon receiving user selection of toggle option "High" 1216, the server proceeds to uncensor the media stream currently being processed by the server.

In some implementations, user interface options screen 1202 includes "Uncensor Characters:" toggle box 1218 with toggle option "No" for character Alex 1220, toggle option "Yes" for character Alex 1222, toggle option "No" for character Bill 1224, toggle option "Yes" for character Bill 1226. In some embodiments, the server, upon receiving user selection of toggle option "Yes" for character Alex 1222 and/or toggle option "Yes" for character Bill 1226, proceeds to uncensor the media stream for the respective character. In some embodiments, the server, upon receiving user selection of toggle option "No" for character Alex 1220 and/or toggle option "No" for character Bill 1224, proceeds to leave the media stream currently being processed by the server in its censored form for the respective character. In some embodiments, character censorship level could be based on MPAA ratings, e.g., G, PG, PG-13, R. and NC-17, or TV ratings, e.g., TV-Y, TV-Y7, TV-Y7 FV, TV-G, TV-PG, TV-14, and TV-MA.

In some implementations, user interface options screen 1202 includes "Uncensor Content:" toggle box 1228 with toggle option "No" for the action genre 1230, toggle option "Yes" for the action genre 1232, toggle option "No" for the comedy genre 1234, toggle option "Yes" for the comedy genre 1236, toggle option "No" for the drama genre 1238, toggle option "Yes" for the drama genre 1240, toggle option "No" for the romance genre 1242, and toggle option "Yes" for the romance genre 1244. In some embodiments, the server, upon receiving user selection of any one of toggle option "Yes" for the action genre 1232, toggle option "Yes" for the comedy genre 1236, toggle option "Yes" for the drama genre 1240, or toggle option "Yes" for the romance genre 1244, proceeds to uncensor the media stream for the respective genre. In some embodiments, the server, upon receiving user selection of any one of toggle option "No" for the action genre 1230, toggle option "No" for the comedy genre 1234, toggle option "No" for the drama genre 1238, or toggle option "No" for the romance genre 1242, proceeds to leave the media stream currently being processed by the server in its censored form for the respective genre.

In some approaches, user interface options screen 1202 includes "Character Censorship Level:" toggle box 1246 with toggle option "Censored" for character Alex 1248, toggle option "Medium" for character Alex 1250, toggle option "Fully Uncensored" for character Alex 1252, toggle option "Censored" for character Bill 1254, toggle option "Medium" for character Bill 1256, and toggle option "Fully Uncensored" 1258 for character Bill. In some embodiments, the server, upon receiving user selection of toggle option "Fully Uncensored" for character Alex 1252 and toggle option "Fully Uncensored" 1258 for character Bill, the server proceeds to uncensor the media stream currently being processed by the server for the respective character. In some embodiments, the server, upon receiving user selection of toggle option "Medium" for character Alex 1250 or toggle option "Medium" for character Bill 1256, the server proceeds to determine replacement words for some more obscene censored content, as described above in Table 1 with reference to FIG. 1, and uncensor the milder censored content within the media stream currently being processed by the server for the respective character. In some embodiments, the server, upon receiving user selection of toggle option "Censored" for character Alex 1248, or toggle option "Censored" for character Bill 1254, the server proceeds to leave the media stream currently being processed by the server in its censored form for the respective character. In some embodiments, user interface options screen 1202 includes a dropdown menu labeled "Watch the Following Version," with a dropdown list of ratings, to choose from, e.g., MPAA ratings, including G, PG, PG-13, R, and NC-17, or TV ratings, including TV-Y, TV-Y7, TV-Y7 FV, TV-G, TV-PG, TV-14, and TV-MA.

Figure 13:
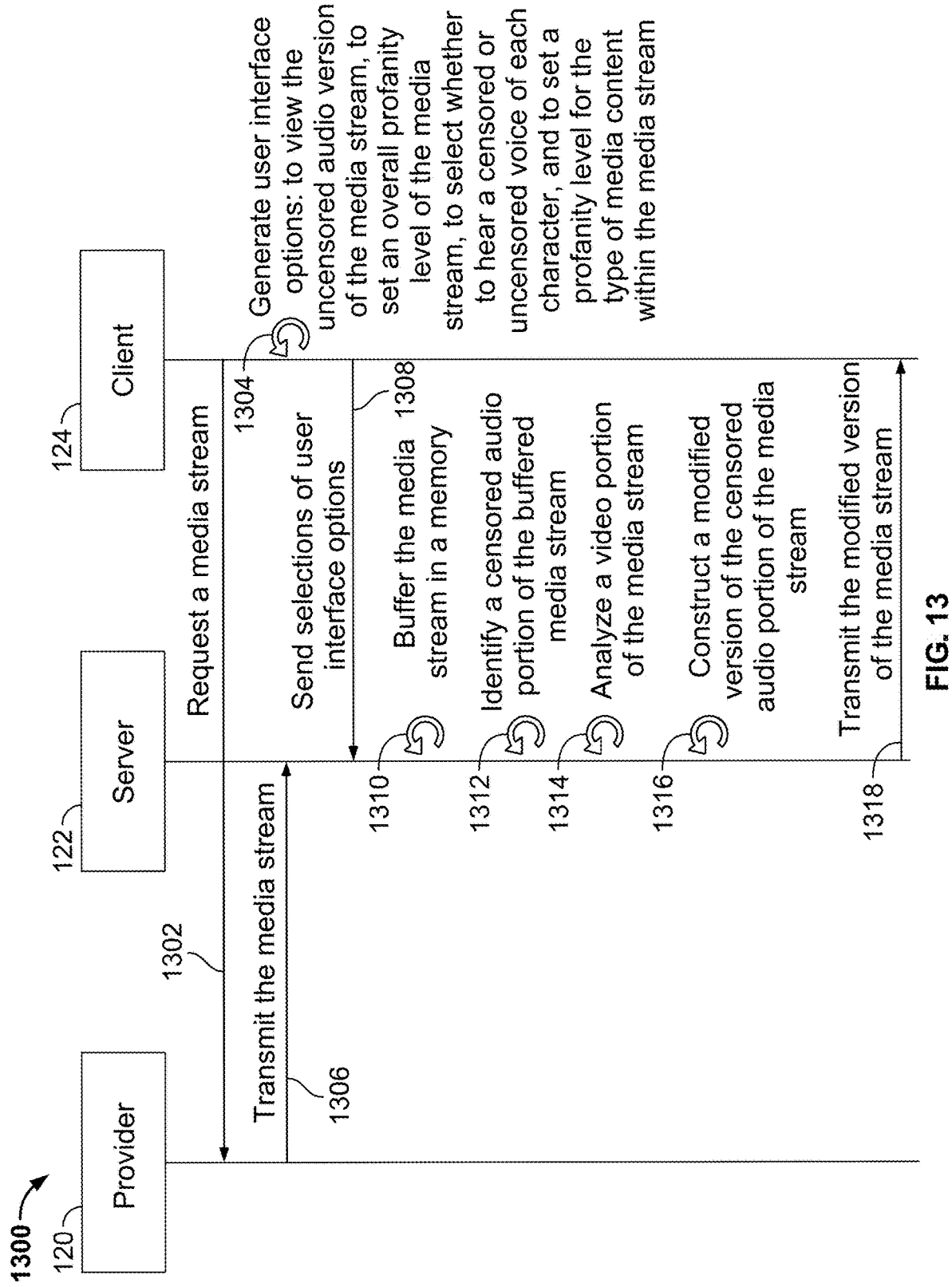
FIG. 13 is a block diagram of a system for processing censored media, in accordance with some embodiments of the present disclosure.

FIG. 13 is a block diagram of a system for processing censored media, in accordance with some embodiments of the present disclosure. System 300 includes provider 120 of FIGS. 1A, server 122 of FIG. 1A, and client device 124 of FIG. 1A. In one approach, at 1302, client device 124 requests a media stream, e.g., media stream 126 of FIG. 1A, from provider 120. In some embodiments, at 1304, client device 124 generates user interface options to view the uncensored audio version of the media stream, to set an overall profanity level of the media stream, to select whether to hear a censored or uncensored voice of each character, and to set a profanity level for the type of content within the media stream, e.g., as described above with reference to FIG. 12.

In some approaches, at 1306, provider 120 transmits the media stream to server 122. In some embodiments, at 1308, client device 124 sends the selections of user interface options from process step 1304 to server 122. In some embodiments, at 1310, server 122 buffers the media stream in a memory, e.g., storage 616 of FIG. 6. In some embodiments, at 1312, server 122 identifies a censored audio portion of the buffered media stream. In some embodiments, at 1314, server 122 analyzes a video portion of the media stream. In some embodiments, at 1316, server 122 constructs a modified version of the censored audio portion of the media stream. In some embodiments, at 1318, server 122 transmits the modified version of the media stream to the client device 124.

Figure 14:
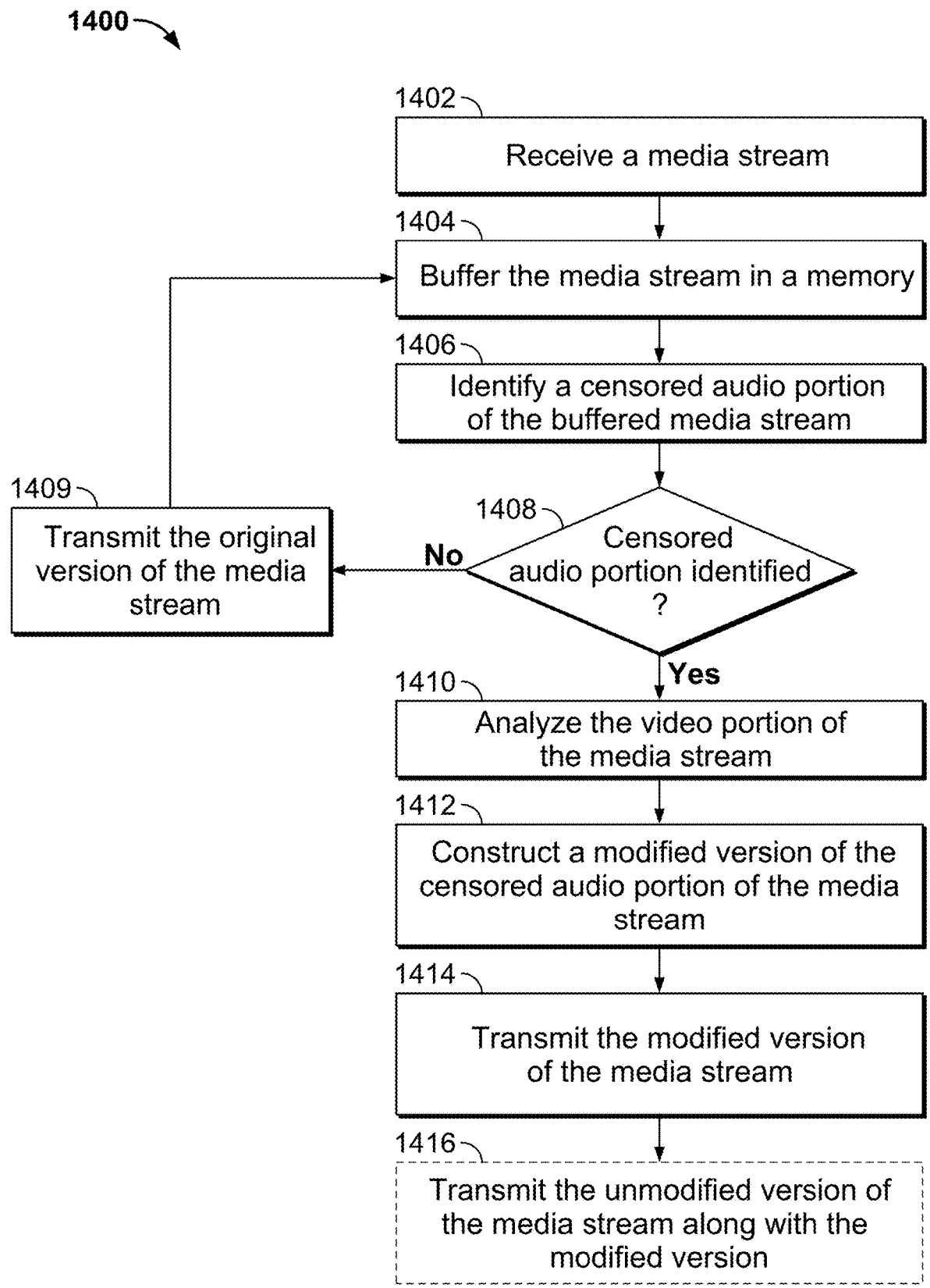
FIG. 14 shows a flowchart of an illustrative process for processing censored media, in accordance with some embodiments of the present disclosure.

FIG. 14 shows a flow diagram of an illustrative process for processing censored media, in accordance with some embodiments of the present disclosure. The individual steps of process 1400 may be implemented by server 122 of FIG. 1A, or client device 170 of FIG. 1B. For example, non-transitory memories of one or more components of server 122 of FIG. 1A or client device 170 of FIG. 1B, or any of the servers or devices of FIG. 6, may store instructions that, when executed by server 122, client device 170, or the server and devices of FIG. 6, cause execution of the steps of process 1400. In some embodiments, the process steps in process 1400 may be performed in an alternative order to the flow depicted in FIG. 14.

In some embodiments, at 1402, a server, e.g., server 122, receives a media stream, e.g., media stream 126 of FIG. 1A from, for example, provider 120 of FIG. 1A. In some embodiments, at 1404, the server buffers the media stream in a memory, e.g., storage 616 of FIG. 6. In some embodiments, at 1406, the server identifies a censored audio portion of the buffered media stream. In some embodiments, at 1408, the server determines whether a censored audio portion has been identified. In some embodiments, if a censored audio portion has not been identified, process 1400 proceeds to 1409, and transmits the original version of the media stream. In some embodiments, process 1400 then returns to 1404, and continues to buffer the media stream in memory. If a censored audio portion has been identified, process 1400 proceeds to 1410.

In some embodiments, at 1410, the server analyzes the video portion of the media stream. In some embodiments, at 1412, the server constructs a modified version of the censored audio portion of the media stream. In some embodiments, at 1414, the server transmits the modified version of the media stream. In some embodiments, process 1400 ends at 1414. In some embodiments, at 1416, the server may transmit the unmodified version of the media stream along with the modified version.

FIG. 15 shows a flow diagram of an illustrative process for processing censored media, in accordance with some embodiments of the present disclosure. In various embodiments, the individual steps of process 1500 may be implemented by server 122 of FIG. 1A, or client device 170 of FIG. 1B. For example, non-transitory memories of one or more components of server 122 of FIG. 1A or client device 170 of FIG. 1B, or any of the servers or devices of FIG. 6, may store instructions that, when executed by server 122, client device 170, or the server and devices of FIG. 6, cause execution of the steps of process 1400. In some embodiments, the process steps in process 1500 may be performed in an alternative order to the flow depicted in FIG. 15.

In some implementations, at 1410, which is process step 1410 from FIG. 14, a server, e.g., server 122, analyzes the video portion of a media stream, e.g., media stream 126 of FIG. 1A from, for example, provider 120 of FIG. 1A. In some embodiments, at 1502, the server uses facial analysis and lip-reading to identify the censored word within the censored audio portion. In some embodiments, at 1504, the server performs natural language processing to infer the censored word based on words surrounding the censored audio portion. In some embodiments, at 1506, the server analyzes subtitles and closed captions to identify the censored word. In some embodiments, at 1508, the server maintains a character buffer for the voice of the character, e.g., character 134 of FIG. 1A, by storing a sample of the character's voice from the media stream.

In some embodiments, at 1508, the server determines whether the censored word has been identified, through any one of process steps 1502, 1504, or 1506. If the censored word has not been identified, process 1500 returns to 1410 and continues to analyze the video portion of the media stream. If the censored word has been identified, process 1500 continues to 1514.

In some approaches, at 1512, the server determines whether sufficient voice sample data has been obtained. If sufficient voice sample data has not been obtained, process 1500 returns to 1508 and continues to maintain a character buffer for the voice of the character. If sufficient voice sample data has been obtained, process 1500 continues to 1514.

At 1514, the server detects background audio within the censored portion. At 1516, the server synthesizes the identified censored word based on the character buffer.

The foregoing is merely illustrative of the principles of this disclosure and its various embodiments. Various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims.

What is claimed is:

1. A method comprising:
receiving a media stream;
buffering the media stream in a memory;
identifying a censored audio portion of the buffered media stream;
constructing a modified version of the censored audio portion of the media stream based at least on analyzing a video portion of the media stream wherein the analyzing the video portion of the media stream comprises:
identifying a censored word within the censored audio portion based on performing facial analysis of the video portion of the media stream to identify the censored word; and
transmitting the modified version of the media stream, wherein the modified version of the media stream comprises an uncensored audio version of the censored audio portion of the media stream.

2. The method of claim 1, further comprising:
transmitting an unmodified version of the media stream along with the modified version, wherein at least one of the transmissions of the modified version or the transmission of the unmodified version is encrypted.

3. The method of claim 1, wherein the media stream comprises the video portion and an audio portion, and wherein the identifying the censored audio portion of the buffered media stream comprises detecting one of a beep sound, a silence, or a partially muted portion within the audio portion of the media stream.

4. The method of claim 1, further comprising:
generating a user interface option for choosing to output the uncensored audio version of the media stream; and
wherein the identifying the censored audio portion of the buffered media stream is performed in response to detecting a selection of the user interface option for choosing to output the uncensored audio version of the media stream.

5. The method of claim 1, further comprising:
generating a user interface option to set an overall profanity level for the media stream;
wherein the identifying the censored audio portion of the buffered media stream is performed in response to detecting a selection of the user interface option to output the media stream at a high profanity level.

6. The method of claim 1, further comprising:
generating a user interface option to set a profanity level for a type of media content within the media stream;
wherein the identifying the censored audio portion of the buffered media stream is performed in response to detecting a selection of the user interface option to output the type of media content within the media stream at a high profanity level.

7. The method of claim 1, wherein the performing facial analysis comprises performing lip-reading analysis.

8. The method of claim 1, further comprising:
maintaining a ranked list of profane words; and
determining whether to construct the modified version of the censored audio portion of the media stream based on a placement of the identified censored word on the ranked list of profane words.

9. The method of claim 1, wherein the constructing the modified version of the censored audio portion of the media stream further comprises:
comparing the identified censored word within the censored audio portion to a list of words with similar meanings and significance of the identified censored word;
determining a replacement word for the identified censored word; and
constructing the modified version of the censored audio portion of the media stream using the replacement word.

10. The method of claim 1, wherein the constructing the modified version of the censored audio portion of the media stream further comprises:
in response to detecting a selection of the user interface option to output the type of media content within the media stream at a low profanity level:
comparing the identified censored word within the censored audio portion to a list of words with similar meanings and significance of the identified censored word;
determining a replacement word for the identified censored word; and
constructing the modified version of the censored audio portion of the media stream using the replacement word.

11. The method of claim 1, further comprising:
in response to detecting a character depicted in the media stream, maintaining a character buffer for a voice of the character by storing a sample of character's voice from the media stream;
wherein the constructing the modified version of the censored audio portion of the media stream comprises synthesizing the identified censored word based on the character buffer.

12. The method of claim 11, wherein the identifying the censored word within the censored audio portion comprises:
training a classifier machine learning model based on a training set comprising video recordings of characters pronouncing words that are likely to be censored; and
inputting into the classifier machine learning model the video portion and the audio portion of the media stream;
wherein the synthesizing the identified censored word comprises:
training a synthesizer machine learning model based on a training set comprising pairs of censored and uncensored voice samples; and
inputting into the synthesizer machine learning model the identified censored word and the buffered voice of the character to cause the synthesizer machine learning model to output the uncensored audio version of the censored audio portion of the media stream.

13. The method of claim 11, wherein the synthesizing the identified censored word comprises:
training a synthesizer machine learning model based on a training set comprising pairs of censored and uncensored voice samples; and
inputting into the synthesizer machine learning model the identified censored word and stored samples of the voice of the character to cause the synthesizer machine learning model to output the uncensored audio version of the censored audio portion of the media stream.

14. The method of claim 11, wherein the constructing the modified version of the censored audio portion of the media stream is further based on detected background audio within the censored audio portion.

15. The method of claim 11, further comprising:
generating a first user interface option for selecting whether to output a censored or uncensored voice of the character;
wherein the maintaining the character buffer for the voice of the character is performed in response to detecting a selection of the first user interface option to output the uncensored voice of the character;
generating a second user interface option for selecting whether to output a censored or uncensored voice of a different character; and
refraining from constructing an uncensored audio version for the different character in response to detecting a selection of the second user interface option to output the censored voice of the different character.

16. The method of claim 1, wherein the analyzing the video portion of the media stream comprises:
identifying a censored word within the censored audio portion based on at least one of:
(b) performing natural language processing to infer the censored word based on words surrounding the censored audio portion of the media stream; or
(c) analyzing subtitles and closed captions to identify the censored word.

17. A method comprising:
receiving a media stream;
buffering the media stream in a memory;
identifying a censored audio portion of the buffered media stream;
constructing a modified version of the censored audio portion of the media stream, based at least on analyzing a video portion of the media stream wherein the analyzing the video portion of the media stream comprises:
identifying a censored word within the censored audio portion based on performing facial analysis of the video portion of the media stream to identify the censored word; and
playing the modified version of the media stream, wherein the modified version of the media stream comprises an uncensored audio version of the censored audio portion of the media stream.

18. A system comprising:
a memory;
input/output circuitry configured to:
receive a media stream; and
control circuitry configured to:
buffer the media stream in the memory;
identify a censored audio portion of the buffered media stream; and
construct a modified version of the censored audio portion of the media stream;
identifying a censored word within the censored audio portion based on performing facial analysis of the video portion of the media stream to identify the censored word; and
wherein the input/output circuitry is further configured to:
transmit the modified version of the media stream, wherein the modified version of the media stream comprises an uncensored audio version of the censored audio portion of the media stream.

19. The system of claim 18, wherein the input/output circuitry is further configured to: transmit an unmodified version of the media stream along with the modified version, wherein at least one of the transmissions of the modified version or the transmission of the unmodified version is encrypted.

20. The system of claim 18, wherein the media stream comprises the video portion and an audio portion, and wherein the control circuitry, when identifying the censored audio portion of the buffered media stream is further configured to detect one of a beep sound, a silence, or a partially muted portion within the audio portion of the media stream.

* * * * *